(12) United States Patent
Pirman et al.

(10) Patent No.: US 12,153,566 B1
(45) Date of Patent: Nov. 26, 2024

(54) SYSTEM AND METHOD FOR AUTOMATED DATA SOURCE DEGRADATION DETECTION

(71) Applicant: Bank of America Corporation, Charlotte, NC (US)

(72) Inventors: Stephanie Margaret Pirman, Chicago, IL (US); Jeffrey Wayne Texada, Carrollton, TX (US); Eric Joseph DePree, Evanston, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/533,294

(22) Filed: Dec. 8, 2023

(51) Int. Cl.
*G06F 16/00* (2019.01)
*G06F 16/23* (2019.01)

(52) U.S. Cl.
CPC .............................. *G06F 16/2365* (2019.01)

(58) Field of Classification Search
CPC .................................................. G06F 16/2365
See application file for complete search history.

(56) References Cited

U.S. PATENT DOCUMENTS

| | | | |
|---|---|---|---|
| 6,694,362 B1 | 2/2004 | Secor et al. |
| 7,685,083 B2 | 3/2010 | Fairweather |
| 8,028,199 B1 | 9/2011 | Guruprasad et al. |
| 8,194,646 B2 | 6/2012 | Elliott et al. |
| 8,468,244 B2 | 6/2013 | Redlich et al. |
| 8,676,753 B2 | 3/2014 | Sivasubramanian et al. |
| 8,725,667 B2 | 5/2014 | Kaushal et al. |
| 8,887,286 B2 | 11/2014 | Dupont et al. |
| 8,909,604 B1 | 12/2014 | Holenstein et al. |
| 9,110,898 B1 | 8/2015 | Chamness et al. |
| 9,438,648 B2 | 9/2016 | Asenjo et al. |
| 9,665,437 B2 | 5/2017 | Bhargava et al. |
| 9,799,017 B1 | 10/2017 | Vermeulen et al. |
| 9,860,152 B2 | 1/2018 | Xia et al. |
| 10,417,108 B2 | 9/2019 | Tankersley et al. |
| 10,608,911 B2 | 3/2020 | Nickolov et al. |
| 10,740,358 B2 | 8/2020 | Chan et al. |
| 10,904,276 B2 | 1/2021 | Phadke et al. |
| 11,038,784 B2 | 6/2021 | Nickolov et al. |
| 11,356,320 B2 | 6/2022 | David et al. |
| 11,386,058 B2 | 7/2022 | Hung et al. |

(Continued)

OTHER PUBLICATIONS

U.S. Appl. No. 18/533,347, "System and method for automated data item degradation detection", filed Dec. 8, 2023.

(Continued)

*Primary Examiner* — Syed H Hasan

(57) ABSTRACT

A method includes determining a first number of logs of a first log type that are generated by a first data store at a first time for a first time interval. A first baseline number and a first threshold value are determined for the first data store. The first baseline number is an expected number of logs of the first log type generated by the first data store at the first time for the first time interval. In response to determining that the first number of logs differs from the first baseline number by more than the first threshold value, the first data store and the first log type are identified as degraded. A report is generated. The report includes an identification that the first data store is degraded and an identification that the first log type is degraded.

20 Claims, 11 Drawing Sheets

(56) References Cited

U.S. PATENT DOCUMENTS

| | | |
|---|---|---|
| 11,397,709 B2 | 7/2022 | Vermeulen et al. |
| 11,494,295 B1 | 11/2022 | Sirianni et al. |
| 11,663,097 B2 | 5/2023 | McAuliffe et al. |
| 11,687,418 B2 | 6/2023 | Baker et al. |
| 11,741,114 B2 | 8/2023 | Hayes et al. |
| 11,792,217 B2 | 10/2023 | David et al. |
| 2006/0184529 A1* | 8/2006 | Berg .................... G06F 11/079 |
| | | 714/E11.026 |
| 2008/0077825 A1 | 3/2008 | Bello et al. |
| 2008/0155336 A1 | 6/2008 | Joshi et al. |
| 2014/0173233 A1* | 6/2014 | Higashiyama ........ G06F 3/0674 |
| | | 711/162 |
| 2019/0265082 A1 | 8/2019 | Zafar et al. |
| 2019/0354426 A1* | 11/2019 | Zhao ................... G06F 11/3485 |
| 2020/0136943 A1 | 4/2020 | Banyai et al. |
| 2021/0081432 A1 | 3/2021 | Grunwald et al. |
| 2022/0045927 A1* | 2/2022 | Liu ...................... H04L 43/062 |
| 2022/0138556 A1* | 5/2022 | Richardson ........... G06F 16/258 |
| | | 706/25 |
| 2022/0156173 A1 | 5/2022 | Chandrasekaran et al. |
| 2023/0070701 A1* | 3/2023 | Wang .................. H04L 41/5012 |
| 2023/0118563 A1 | 4/2023 | Yadav et al. |

OTHER PUBLICATIONS

U.S. Appl. No. 18/533,516, "System and method for automated data pipeline degradation detection", filed Dec. 8, 2023.

* cited by examiner

SYSTEM AND METHOD FOR AUTOMATED DATA SOURCE DEGRADATION DETECTION

TECHNICAL FIELD

The present disclosure relates generally to a data degradation detection, and more specifically to a system and method for automated data source degradation detection.

BACKGROUND

Failures in data sources and data pipelines are frequently silent and are only discovered by analysts identifying discrepancies between data sets. This degraded state could lead to key data sources being down and critical detection failures. When data sources rely on other sources, which may occur in decentralized systems, the data degradation can have broader and more substantial impact.

SUMMARY

The system described in the present disclosure provides several practical applications and technical advantages that overcome the current technical problems with detecting data degradation.

In general, a system comprises a data monitoring system that is operably coupled to a plurality of data stores via a network. In certain embodiments, the data monitoring system may be configured to perform a method for automated data source degradation detection. In operation, the data monitoring system selects a data store from a plurality of data stores and determines whether a maintenance notice is received for the selected data store. In response to determining that the maintenance notice is received for the selected data store, the data monitoring system identifies the selected data store as degraded, identifies log types of the selected data store as degraded, and determines impact scores of the degraded log types of the selected data store.

In response to determining that the maintenance notice is not received for the selected data store, the data monitoring system selects a log type from a plurality of log types of the selected data store. The data monitoring system determines a number of logs of the selected log type that is generated by the selected data store at a first time for a time interval. The data monitoring system determines a baseline number and a threshold value for the selected log type. The baseline number is an expected number of logs of the selected log type to be generated by the selected data store at the first time for the time interval.

The data monitoring system compares the number of logs of the selected log type to the baseline number and determines whether the number of logs of the selected log type differs from the baseline number by more than the threshold value. In response to determining that the number of logs of the selected log type does not differ from the baseline number by more than the threshold value, the data monitoring system identifies the selected log type as not degraded and saves the number of logs of the selected log type in the data store profile of the selected data store.

In response to determining that the number of logs of the selected log type differs from the baseline number by more than the threshold value, the data monitoring system identifies the selected data store as a degraded, identifies the selected log type as a degraded, and determines an impact score of the selected log type. The data monitoring system determines whether all log types of the selected data store are analyzed. In response to determining all log types of the selected data store are not analyzed, the process is repeated for all unanalyzed log types until all log types of the selected data store are analyzed.

In response to determining that all log types of the selected data store are analyzed, the data monitoring system analyzes a dependency information of the selected data store and determines whether one or more related data stores are identified for the selected data store. In response to determining that the one or more related data stores are identified for the selected data store, the data monitoring system selects a related data store from the one or more related data stores and identifies one or more paths connecting the selected data store to the selected related data store.

The data monitoring system selects a path of the one or more paths and determines whether a source log type of the selected path is identified as degraded. In response to determining that the source log type of the selected path is identified as degraded, the data monitoring system identifies a destination log type of the selected path as degraded and determines an impact score for the degraded destination log type. The data monitoring system determines whether are all paths are analyzed. In response to determining that all paths are not analyzed, the process is repeated for all unanalyzed paths until all paths are analyzed. In response to determining that all paths are analyzed, the data monitoring system identifies the selected related data store as degraded.

The data monitoring system determines whether all related data stores are analyzed. In response to determining that all related data stores are not analyzed, the process is repeated for all unanalyzed related data stores until all related data stores are analyzed. In response to determining that all related data stores are analyzed, the data monitoring system determines whether all data stores are analyzed. In response to determining that all data stores are not analyzed, the process is repeated for all unanalyzed data stores until all data stores are analyzed. In response to determining that all data stores are analyzed, the data monitoring system generates a report. In certain embodiments, the report comprises identifications of degraded data stores, identifications of degraded log types for each degraded data stores, and impact scores of the degraded log types. In certain embodiments when a maintenance notice is received for a data store, the report further comprises an identification that the data store is degraded due to maintenance.

The data monitoring system determines a priority of the report and determines whether the priority is "High" or "Low." In response to determining that the priority is "Low," the data monitoring system sends the report to a data store maintenance team. In response to determining that the priority is "High," the data monitoring system generates an alert that the report needs an immediate response, and sends the report and the alert to the data store maintenance team.

The data monitoring system determines whether to stop the degradation detection process. In certain embodiments, the data monitoring system may determine to stop the degradation detection process in response to receiving an instruction to stop the degradation detection process. In response to determining that the instruction to stop the degradation detection process is not received, the degradation detection process is repeated until the instruction to stop the degradation detection process is received.

In other embodiments, the data monitoring system may be configured to perform a method for automated data pipeline degradation detection. In operation, the data monitoring system analyzes dependency information of a plurality of data stores, identifies one or more data pipelines based on the dependency information, selects a data pipeline, and determines a time delay of the selected data pipeline. The data monitoring system identifies a source data store and a source log type of the selected data pipeline, and a destination data store and a destination log type of the selected data pipeline.

The data monitoring system determines a first number of logs of the source log type that is generated by the source data store at a first time for a time interval and determines a first baseline number and a first threshold value for the source log type. In certain embodiments, the first baseline number is an expected number of logs of the source log type to be generated by the source data store at the first time for the time interval.

The data monitoring system compares the first number of logs of the source log type to the first baseline number and determines whether the first number of logs of the source log type differs from the first baseline number by less than the first threshold value. In response to determining that the first number of logs of the source log type differs from the first baseline number by less than the first threshold value, the data monitoring system determines a second number of logs of the destination log type that is generated by the destination data store at a second time for the time interval. In certain embodiments, the second time is later than the first time by the time delay. The data monitoring system determines a second baseline number and a second threshold value for the destination log type. In certain embodiments, the second baseline number is an expected number of logs of the destination log type to be generated by the destination data store at the second time for the time interval.

The data monitoring system compares the second number of logs of the destination log type to the second baseline number and determines whether the second number of logs of the destination log type differs from the second baseline number by more than the second threshold value. In response to determining that the second number of logs of the destination log type does not differ from the second baseline number by more than the second threshold value, the data monitoring system identifies the selected data pipeline as not degraded. In response to determining that the second number of logs of the destination log type differs from the second baseline number by more than the second threshold value, the data monitoring system identifies the selected data pipeline as degraded, identifies the destination data store of the selected data pipeline as degraded, identifies the destination log type of the selected data pipeline as degraded, and determines an impact score of the degraded destination log type of the selected data pipeline.

The data monitoring system analyzes a dependency information of the destination data store of the selected data pipeline and determines whether one or more related data stores are identified for the destination data store. In response to determining that the one or more related data stores are identified for the destination data store, the data monitoring system selects a related data store from the one or more related data stores and identifies one or more paths connecting the destination data store to the selected related data store. The data monitoring system selects a path from the one or more paths and determines whether a source log type of the selected path is identified as degraded. In response to determining that the source log type of the selected path is identified as degraded, the data monitoring system identifies a destination log type of the selected path as degraded and determines an impact score for the destination log type of the selected path.

The data monitoring system determines whether are all paths are analyzed. In response to determining that all paths are not analyzed, the process is repeated for all unanalyzed paths until all paths are analyzed. In response to determining that all paths are analyzed, the data monitoring system identifies the selected related data store as degraded. The data monitoring system determines whether all related data stores are analyzed. In response to determining that all related data stores are not analyzed, the process is repeated for all unanalyzed related data stores until all related data stores are analyzed. In response to determining that all related data stores are analyzed, the data monitoring system determines whether all data pipelines are analyzed. In response to determining that all data pipelines are not analyzed, the process is repeated for all unanalyzed data pipelines until all data pipelines are analyzed.

In response to determining that all data pipelines are analyzed, the data monitoring system generates a report. In certain embodiments, the report comprises identification of degraded data pipelines, identifications of degraded data stores, identifications of degraded log types for each degraded data stores, and impact scores of the degraded log types. The data monitoring system determines a priority of the report and determines whether the priority is "High" or "Low." In response to determining that the priority is "Low," the data monitoring system sends the report to a data store maintenance team. In response to determining that the priority is "High," the data monitoring system generates an alert that the report needs an immediate response, and sends the report and the alert to the data store maintenance team.

The data monitoring system determines whether to stop the degradation detection process. In certain embodiments, the data monitoring system may determine to stop the degradation detection process in response to receiving an instruction to stop the degradation detection process. In response to determining that the instruction to stop the degradation detection process is not received, the degradation detection process is repeated until the instruction to stop the degradation detection process is received.

In yet other embodiments, the data monitoring system may be configured to perform a method for automated data item degradation detection. In operation, the data monitoring system selects a data store from a plurality of data stores, selects a log type from a plurality of log types of the selected data store, and analyzes a log of the selected log type. The data monitoring system determines whether the log has a format of the selected log type. In response to determining that the log has the format of the selected log type, the data monitoring system identifies the selected log type as not degraded. In response to determining that the log does not have the format of the selected log type, the data monitoring system identifies the selected data store as a degraded, identifies the selected log type as a degraded, and determines an impact score of the selected log type.

The data monitoring system determines whether all log types of the selected data store are analyzed. In response to determining that all log types of the selected data store are not analyzed, the process is repeated for all unanalyzed log type of the selected data store until all log types of the selected data store are analyzed. In response to determining that all log types of the selected data store are analyzed, the data monitoring system analyzes a dependency information of the selected data store and determines whether one or more related data stores are identified for the selected data store. In response to determining that the one or more related data stores are identified for the selected data store, the data monitoring system selects a related data store from the one or more related data stores.

The data monitoring system identifies one or more paths connecting the selected data store to the selected related data store, selects a path of the one or more paths, and determines whether a source log type of the selected path is identified as degraded. In response to determining that the source log type of the selected path is identified as degraded, the data monitoring system identifies a destination log type of the selected path as degraded and determines an impact score for the degraded destination log type. The data monitoring system determines whether are all paths are analyzed. In response to determining that all paths are not analyzed, the process is repeated for all unanalyzed paths until all paths are analyzed. In response to determining that all paths are analyzed, the data monitoring system identifies the selected related data store as degraded.

The data monitoring system determines whether all related data stores are analyzed. In response to determining that all related data stores are not analyzed, the process is repeated for all unanalyzed related data store until all related data stores are analyzed. In response to determining that all related data stores are analyzed, the data monitoring system determines whether all data stores are analyzed. In response to determining that all data stores are not analyzed, the process is repeated for all unanalyzed data stores until all data stores are analyzed. In response to determining that all data stores are analyzed, the data monitoring system generates a report. In certain embodiments, the report comprises identifications of degraded data stores, identifications of degraded log types for each degraded data store, and impact scores of the degraded log types.

The data monitoring system determines a priority of the report and determines whether the priority is "High" or "Low." In response to determining that the priority is "Low," the data monitoring system sends the report to a data store maintenance team. In response to determining that the priority is "High," the data monitoring system generates an alert that the report needs an immediate response, and sends the report and the alert to the data store maintenance team.

The data monitoring system determines whether to stop the degradation detection process. In certain embodiments, the data monitoring system may determine to stop the degradation detection process in response to receiving an instruction to stop the degradation detection process. In response to determining that the instruction to stop the degradation detection process is not received, the degradation detection process is repeated until the instruction to stop the degradation detection process is received.

The present disclosure provides various advantages. The system disclosed herein allows for automatic detection of various data degradation types in a plurality of data stores. In particular, the system allows for comprehensive detection of data degradation sources that include identifying an initial point-of-failure (for example, by identifying a degraded data store and/or a degraded data pipeline) as well as downstream impacts on other data stores (for example, by analyzing dependency information for an initial degraded data store or an initial degraded data pipeline). By detecting data degradation and providing a degradation report to a data store maintenance team, downtime of the plurality of data stores may be reduced. Accordingly, the following disclosure is particularly integrated into practical applications of: (1) automatic detection of various data degradation types in a plurality of data stores; and (2) reducing downtime of the plurality of data stores due to data degradation.

In one embodiment, a system includes a memory and a processor operably coupled to the memory. The memory is configured to store a first database and a second database.

The first database includes a first profile for a first data store of a plurality of data stores. The first profile includes a first plurality of log types that are generated by the first data store, a first plurality of impact scores associated with the first plurality of log types, and first dependency information for the first data store. The first dependency information identifies that no data store receives data items from the first data store. The second database includes a first plurality of numbers and a first plurality of timestamps associated with the first plurality of numbers. Each of the first plurality of numbers is a number of logs of a first log type that were generated by the first data store at a time defined by a respective timestamp for a first time interval. The processor is configured to determine a first number of logs of the first log type that are generated by the first data store at a first time for the first time interval and determine a first baseline number and a first threshold value based on the first plurality of numbers. The first baseline number is an expected number of logs of the first log type generated by the first data store at the first time for the first time interval. The processor is further configured to compare the first number of logs of the first log type to the first baseline number. In response to determining that the first number of logs of the first log type differs from the first baseline number by more than the first threshold value, the processor is further configured to identify the first data store as degraded, identify the first log type as degraded, determine a first impact score of the first log type, and analyze the first dependency information for the first data store. In response to determining that no data store receives data items from the first data store, the processor is further configured to generate a report. The report includes an identification that the first data store is degraded, an identification that the first log type is degraded, and the first impact score of the first log type.

In another embodiment, a system includes a memory and a processor operably coupled to the memory. The memory is configured to store a first database. The first database includes a first profile for a first data store of a plurality of data stores. The first profile includes a first plurality of log types that are generated by the first data store, a first plurality of impact scores associated with the first plurality of log types, a first plurality of formats associated with the first plurality of log types, and first dependency information for the first data store. The first dependency information identifies that no data store receives data items from the first data store. The processor is configured to analyze a first log of a first log type generated by the first data store and determine if the first log has a first format of the first log type. In response to determining that the first log does not have the first format of the first log type, the processor is further configured to identify the first data store as degraded, identify the first log type as degraded, determine a first impact score of the first log type, analyze the first dependency information for the first data store. In response to determining that no data store receives data items from the first data store, the processor is further configured to generate a report. The report includes an identification that the first data store is degraded, an identification that the first log type is degraded, and the first impact score associated with the first log type.

In yet another embodiment, a system includes a memory and a processor operably coupled to the memory. The memory is configured to store a first database and a second database. The first database includes a first profile for a first data store of a plurality of data stores and a second profile for a second data store of the plurality of data stores. The first profile includes a first plurality of log types that are generated by the first data store, a first plurality of impact scores associated with the first plurality of log types, and first dependency information for the first data store. The first dependency information identifies a first data pipeline that associates logs of a first log type generated by the first data store with logs of a second log type generated by a second data store of the plurality of data stores. The first profile further includes a first time delay associated with the first data pipeline. The second profile includes a second plurality of log types that are generated by the second data store, a second plurality of impact scores associated with the second plurality of log types, and second dependency information for the second data store. The second dependency information identifies that no data store receives data items from the second data store. The second database includes a first plurality of numbers and a first plurality of timestamps associated with the first plurality of numbers. Each of the first plurality of numbers is a number of logs of the first log type that were generated by the first data store at a time defined by a respective timestamp for a first time interval. The second database further includes a second plurality of numbers and a second plurality of timestamps associated with the second plurality of numbers. Each of the second plurality of numbers is a number of logs of the second log type that were generated by the second data store at a time defined by a respective timestamp for the first time interval. The processor is configured to analyze the first dependency information for the first data store. In response to determining that the first data pipeline associates the first log type generated by the first data store with the second log type generated by the second data store, the processor is further configured to determine a first number of logs of the first log type that are generated by the first data store at a first time for the first time interval, determine a first baseline number and a first threshold value based on the first plurality of numbers, and compare the first number of logs of the first log type to the first baseline number. The first baseline number is an expected number of logs of the first log type generated by the first data store at the first time for the first time interval. In response to determining that the first number of logs differs from the first baseline number by less than the first threshold value, the processor is further configured to determine that a second number of logs of the second log type are generated by the second data store at a second time for the first time interval, determine a second baseline number and a second threshold value based on the second plurality of numbers, and compare the second number of logs of the second log type to the second baseline number. The second time is later than the first time by the first time delay. The second baseline number is an expected number of logs of the second log type generated by the second data store at the second time for the first time interval. In response to determining that the second number of logs of the second log type differs from the second baseline number by more than the second threshold value, the processor is further configured to identify the first data pipeline as degraded, identify the second data store as degraded, identify the second log type as degraded, determine a second impact score of the second log type, and analyze the second dependency information for the second data store. In response to determining that no data store receives data items from the second data store, the processor is further configured to generate a report. The report includes an identification that the first data pipeline is degraded, an identification that the second data store is degraded, an identification that the second log type is degraded; and the second impact score of the second log type.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide efficient and reliable solutions for detecting data degradation. Embodiments of the present disclosure and its advantages may be understood by referring to FIGS. 1, 2, 3A-3C, 4A-4C, and 5A-5C. FIGS. 1, 2, and 3A-3C are used to describe a system and method for automated data source degradation detection. FIGS. 1, 2, and 4A-4C are used to describe a system and method for automated data pipeline degradation detection. FIGS. 1, 2, and 5A-5C are used to describe a system and method for automated data item degradation detection.

System for Automated Data Degradation Detection

System Overview

Figure 1:
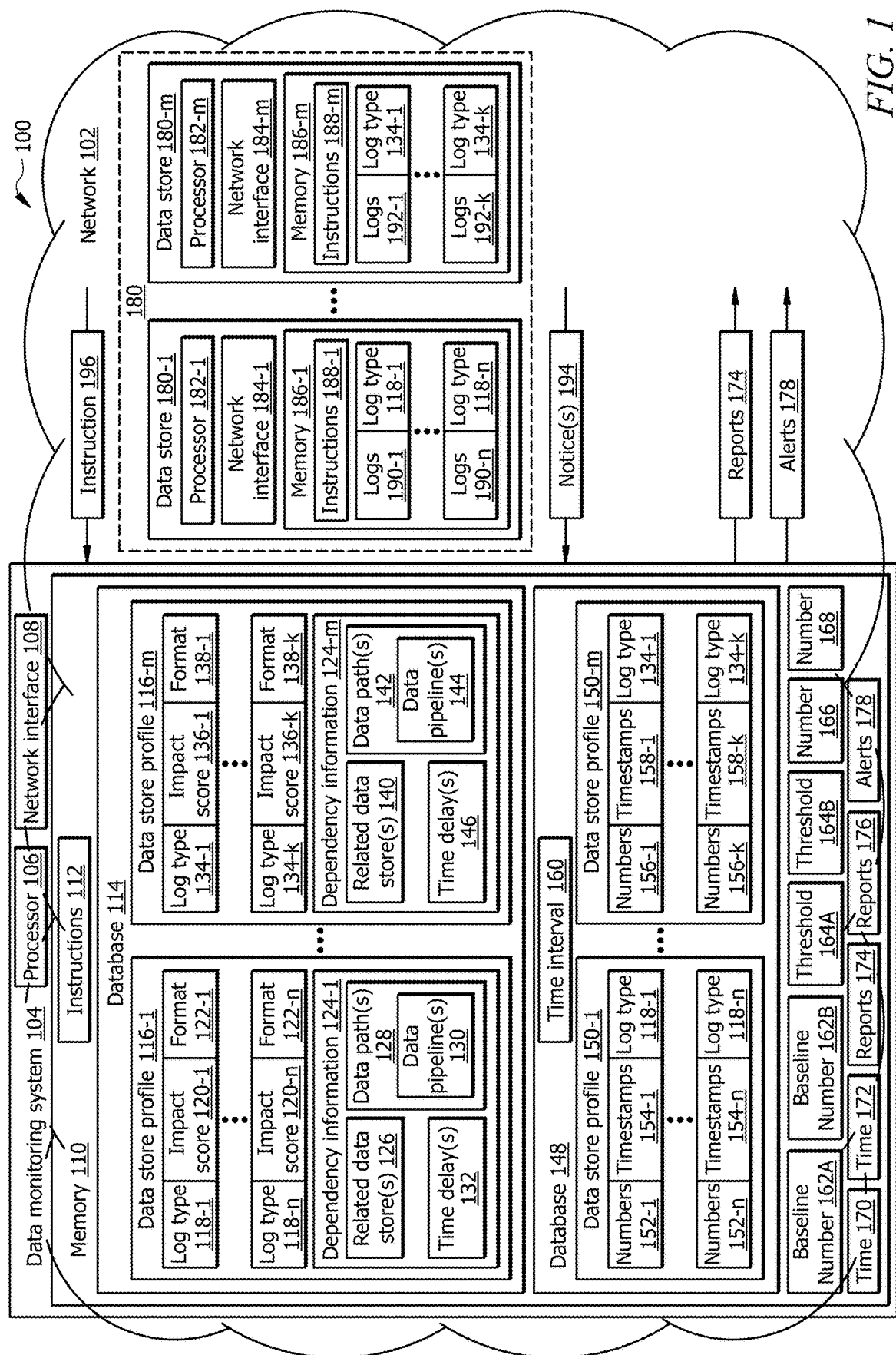
FIG. 1 illustrates an embodiment of a system configured for automated data source degradation detection.

FIG. 1 illustrates an embodiment of a system 100 that is generally configured for automated data degradation detection. In certain embodiments, the system 100 comprises a data monitoring system 104 that is operably coupled to a plurality of data stores 180 (including data stores 180-1 through 180-*m*) via a network 102. Network 102 enables the communication between the components of the system 100. In other embodiments, the system 100 may not have all the components listed and/or may have other elements instead of, or in addition to, those listed above. In certain embodiments, the system 100 may be configured to perform a method for automated data source degradation detection as described below with reference to FIGS. 3A-3C. In other embodiments, the system 100 may be configured to perform a method for automated data pipeline degradation detection as described below with reference to FIGS. 4A-4C. In yet other embodiments, the system 100 may be configured to perform a method for automated data item degradation detection as described below with reference to FIGS. 5A-5C.

In certain embodiments, the data monitoring system 104 may be configured to perform a method for automated data source degradation detection. In operation, the data monitoring system 104 selects a data store (e.g., respective one of data stores 180-1 through 180-*m*) from a plurality of data stores 180 and determines whether a maintenance notice (e.g., respective one of notices 194) is received for the selected data store. In response to determining that the maintenance notice (e.g., respective one of notices 194) is received for the selected data store, the data monitoring system 104 identifies the selected data store as degraded, identifies log types of the selected data store as degraded, and determines impact scores of the degraded log types of the selected data store.

In response to determining that a maintenance notice (e.g., respective one of notices 194) is not received for the selected data store, the data monitoring system 104 selects a log type from a plurality of log types of the selected data store. The data monitoring system 104 determines a number (e.g., number 166) of logs (e.g., logs 190-1, 202-2, 202-4, or 202-7) of the selected log type (e.g., log types 118-1, 204-2, 204-4, or 204-7) that is generated by the selected data store (e.g., data stores 180-1, 180-2, 180-4, or 180-7) at a first time (e.g., time 170) for a time interval (e.g., time interval 160). The data monitoring system 104 determines a baseline number (e.g., baseline number 162A) and a threshold value (e.g., threshold 164A) for the selected log type (e.g., log types 118-1, 204-2, 204-4, or 204-7). The baseline number (e.g., baseline number 162A) is an expected number of logs (e.g., logs 190-1) of the selected log type (e.g., log type 118-1) to be generated by the selected data store (e.g., data store 180-1) at the first time (e.g., time 170) for the time interval (e.g., time interval 160).

The data monitoring system 104 compares the number (e.g., number 166) of logs (e.g., logs 190-1) of the selected log type (e.g., log type 118-1) to the baseline number (e.g., baseline number 162A) and determines whether the number (e.g., number 166) of logs (e.g., logs 190-1) of the selected log type (e.g., log type 118-1) differs from the baseline number (e.g., baseline number 162A) by more than the threshold value (e.g., threshold 164A). In response to determining that the number (e.g., number 166) of logs (e.g., logs 190-1) of the selected log type (e.g., log type 118-1) does not differ from the baseline number (e.g., baseline number 162A) by more than the threshold value (e.g., threshold 164A), the data monitoring system 104 identifies the selected log type (e.g., log type 118-1) as not degraded and saves the number (e.g., number 166) of logs (e.g., logs 190-1) of the selected log type (e.g., log type 118-1) in the data store profile (e.g., data store profile 116-1) of the selected data store (e.g., data store 180-1).

In response to determining that the number (e.g., number 166) of logs (e.g., logs 190-1) of the selected log type (e.g., log type 118-1) differs from the baseline number (e.g., baseline number 162A) by more than the threshold value (e.g., threshold 164A), the data monitoring system 104 identifies the selected data store (e.g., data store 180-1) as a degraded, identifies the selected log type (e.g., log type 118-1) as a degraded, and determines an impact score (e.g., impact score 120-1) of the selected log type (e.g., log type 118-1). The data monitoring system 104 determines whether all log types (e.g., log types 118-1 through 118-*n*) of the selected data store (e.g., data store 180-1) are analyzed. In response to determining all log types (e.g., log types 118-1 through 118-*n*) of the selected data store (e.g., data store 180-1) are not analyzed, the process is repeated for all unanalyzed log types until all log types (e.g., log types 118-1 through 118-*n*) of the selected data store (e.g., data store 180-1) are analyzed.

In response to determining that all log types (e.g., log types 118-1 through 118-*n*) of the selected data store (e.g., data store 180-1) are analyzed, the data monitoring system 104 analyzes a dependency information (e.g., dependency information 124-1) of the selected data store (e.g., data store 180-1) and determines whether one or more related data stores are identified for the selected data store. In response to determining that the one or more related data stores (e.g., data stores 180-5 and 180-6 or data stores 180-8 and 180-9) are identified for the selected data store (e.g., data store 180-4 or data store 180-7), the data monitoring system 104 selects a related data store from the one or more related data stores (e.g., data stores 180-5 and 180-6 or data stores 180-8 and 180-9) and identifies one or more paths connecting the selected data store to the selected related data store.

The data monitoring system 104 selects a path of the one or more paths and determines whether a source log type of the selected path is identified as degraded. In response to determining that the source log type of the selected path is identified as degraded, the data monitoring system 104 identifies a destination log type of the selected path as degraded and determines an impact score for the degraded destination log type. The data monitoring system 104 determines whether are all paths are analyzed. In response to determining that all paths are not analyzed, the process is repeated for all unanalyzed paths until all paths are analyzed. In response to determining that all paths are analyzed, the data monitoring system 104 identifies the selected related data store as degraded.

The data monitoring system 104 determines whether all related data stores are analyzed. In response to determining that all related data stores are not analyzed, the process is repeated for all unanalyzed related data stores until all related data stores are analyzed. In response to determining that all related data stores are analyzed, the data monitoring system 104 determines whether all data stores (e.g., data stores 180) are analyzed. In response to determining that all data stores are not analyzed, the process is repeated for all unanalyzed data stores until all data stores are analyzed. In response to determining that all data stores are analyzed, the data monitoring system 104 generates a report (e.g., report 174). In certain embodiments, the report (e.g., report 174) comprises identifications of degraded data stores, identifications of degraded log types for each degraded data stores, and impact scores of the degraded log types. In certain embodiments when a maintenance notice is received for a data store, the report (e.g., report 174) further comprises an identification that the data store is degraded due to maintenance.

The data monitoring system 104 determines a priority (e.g., priority 176) of the report (e.g., report 174) and determines whether the priority (e.g., priority 176) is "High" or "Low." In response to determining that the priority (e.g., priority 176) is "Low," the data monitoring system 104 sends the report (e.g., report 174) to a data store maintenance team. In response to determining that the priority (e.g., priority 176) is "High," the data monitoring system 104 generates an alert (e.g., alert 178) that the report (e.g., report 174) needs an immediate response, and sends the report (e.g., report 174) and the alert (e.g., alert 178) to the data store maintenance team.

The data monitoring system 104 determines whether to stop the degradation detection process. In certain embodiments, the data monitoring system 104 may determine to stop the degradation detection process in response to receiving an instruction (e.g., instruction 196) to stop the degradation detection process. In response to determining that the instruction (e.g., instruction 196) to stop the degradation detection process is not received, the degradation detection process is repeated until the instruction (e.g., instruction 196) to stop the degradation detection process is received.

In other embodiments, the data monitoring system 104 may be configured to perform a method for automated data pipeline degradation detection. In operation, the data monitoring system 104 analyzes dependency information (e.g., dependency information 124-1 through 124-*m*) of a plurality of data stores 180 (e.g., data stores 180-1 through 180-*m*), identifies one or more data pipelines based on the dependency information (e.g., dependency information 124-1 through 124-*m*), selects a data pipeline, and determines a time delay of the selected data pipeline. The data monitoring system 104 identifies a source data store and a source log type of the selected data pipeline, and a destination data store and a destination log type of the selected data pipeline.

The data monitoring system 104 determines a first number of logs (e.g., number 166) of the source log type that is generated by the source data store at a first time (e.g., time 170) for a time interval (e.g., time interval 160) and determines a first baseline number (e.g., baseline number 162A) and a first threshold value (e.g., threshold 164A) for the source log type. In certain embodiments, the first baseline number (e.g., baseline number 162A) is an expected number of logs (e.g., logs 202-2, 202-4, or 202-7) of the source log type (e.g., log types 204-2, 204-4, or 204-7) to be generated by the source data store (e.g., data stores 180-2, 180-4, or 180-7) at the first time (e.g., time 170) for the time interval (e.g., time interval 160).

The data monitoring system 104 compares the first number of logs (e.g., number 166) of the source log type (e.g., log types 204-2, 204-4, or 204-7) to the first baseline number (e.g., baseline number 162A) and determines whether the first number of logs (e.g., number 166) of the source log type (e.g., log types 204-2, 204-4, or 204-7) differs from the first baseline number (e.g., baseline number 162A) by less than the first threshold value (e.g., threshold 164A). In response to determining that the first number of logs (e.g., number 166) of the source log type (e.g., log types 204-2, 204-4, or 204-7) differs from the first baseline number (e.g., baseline number 162A) by less than the first threshold value (e.g., threshold 164A), the data monitoring system 104 determines a second number of logs (e.g., number 168) of the destination log type (e.g., log types 204-3, 204-5, 204-6, or 204-8) that is generated by the destination data store (e.g., data stores 180-3, 180-5, 180-6, or 180-8) at a second time (e.g., time 172) for the time interval (e.g., time interval 160). In certain embodiments, the second time (e.g., time 172) is later than the first time (e.g., time 170) by the time delay (e.g., time delays 208-1, 208-2, 208-3, or 208-4). The data monitoring system 104 determines a second baseline number (e.g., baseline number 162B) and a second threshold value (e.g., threshold 164B) for the destination log type (e.g., log types 204-3, 204-5, 204-6, or 204-8). In certain embodiments, the second baseline number (e.g., baseline number 162B) is an expected number of logs (e.g., logs 202-3, 202-5, 202-6, or 202-8) of the destination log type (e.g., log types 204-3, 204-5, 205-6, or 204-8) to be generated by the destination data store (e.g., data stores 180-3, 180-5, 180-6, or 180-8) at the second time (e.g., time 172) for the time interval (e.g., time interval 160).

The data monitoring system 104 compares the second number of logs (e.g., number 168) of the destination log type (e.g., log types 204-3, 204-5, 205-6, or 204-8) to the second baseline number (e.g., baseline number 162B) and determines whether the second number of logs (e.g., number 168) of the destination log type (e.g., log types 204-3, 204-5, 205-6, or 204-8) differs from the second baseline number (e.g., baseline number 162B) by more than the second threshold value (e.g., threshold 164B). In response to determining that the second number of logs (e.g., number 168) of the destination log type (e.g., log types 204-3, 204-5, 205-6, or 204-8) does not differ from the second baseline number (e.g., baseline number 162B) by more than the second threshold value (e.g., threshold 164B), the data monitoring system 104 identifies the selected data pipeline (e.g., data pipelines 206-1, 206-2, 206-3, or 206-4) as not degraded. In response to determining that the second number of logs (e.g., number 168) of the destination log type (e.g., log types 204-3, 204-5, 205-6, or 204-8) differs from the second baseline number (e.g., baseline number 162B) by more than the second threshold value (e.g., threshold 164B), the data monitoring system 104 identifies the selected data pipeline (e.g., data pipelines 206-1, 206-2, 206-3, or 206-4) as degraded, identifies the destination data store (e.g., data stores 180-3, 180-5, 180-6, or 180-8) of the selected data pipeline (e.g., data pipelines 206-1, 206-2, 206-3, or 206-4) as degraded, identifies the destination log type (e.g., log types 204-3, 204-5, 205-6, or 204-8) of the selected data pipeline (e.g., data pipelines 206-1, 206-2, 206-3, or 206-4) as degraded, and determines an impact score (e.g., respective one of impact scores 120-1 through 120-*n* and 136-1 through 136-*k*) of the degraded destination log type (e.g., log types 204-3, 204-5, 205-6, or 204-8) of the selected data pipeline (e.g., log types 204-3, 204-5, 205-6, or 204-8).

The data monitoring system 104 analyzes a dependency information (e.g., respective one of dependency information 124-1 through 124-*m*) of the destination data store (e.g., data stores 180-3, 180-5, 180-6, or 180-8) of the selected data pipeline (e.g., data pipelines 206-1, 206-2, 206-3, or 206-4) and determines whether one or more related data stores are identified for the destination data store (e.g., data stores 180-3, 180-5, 180-6, or 180-8). In response to determining that the one or more related data stores (e.g., data store 180-9) are identified for the destination data store (e.g., data store 180-7), the data monitoring system 104 selects a related data store (e.g., data store 180-9) from the one or more related data stores and identifies one or more paths connecting the destination data store (e.g., data store 180-8) to the selected related data store (e.g., data store 180-9). The data monitoring system 104 selects a path (e.g., pipeline 206-5) from the one or more paths and determines whether a source log type (e.g., log type 204-8) of the selected path (e.g., pipeline 206-5) is identified as degraded. In response to determining that the source log type (e.g., log type 204-8) of the selected path (e.g., pipeline 206-5) is identified as degraded, the data monitoring system 104 identifies a destination log type (e.g., log type 134-1) of the selected path (e.g., pipeline 206-5) as degraded and determines an impact score (e.g., the impact score 136-1) for the destination log type (e.g., log type 134-1) of the selected path (e.g., pipeline 206-5).

The data monitoring system 104 determines whether are all paths are analyzed. In response to determining that all paths are not analyzed, the process is repeated for all unanalyzed paths until all paths are analyzed. In response to determining that all paths are analyzed, the data monitoring system 104 identifies the selected related data store (e.g., data store 180-9) as degraded. The data monitoring system 104 determines whether all related data stores are analyzed. In response to determining that all related data stores are not analyzed, the process is repeated for all unanalyzed related data stores until all related data stores are analyzed. In response to determining that all related data stores are analyzed, the data monitoring system 104 determines whether all data pipelines are analyzed. In response to determining that all data pipelines are not analyzed, the process is repeated for all unanalyzed data pipelines until all data pipelines are analyzed.

In response to determining that all data pipelines are analyzed, the data monitoring system 104 generates a report (e.g., report 174). In certain embodiments, the report (e.g., report 174) comprises identification of degraded data pipelines, identifications of degraded data stores, identifications of degraded log types for each degraded data stores, and impact scores of the degraded log types. The data monitoring system 104 determines a priority (e.g., priority 176) of the report (e.g., report 174) and determines whether the priority (e.g., priority 176) is "High" or "Low." In response to determining that the priority (e.g., priority 176) is "Low," the data monitoring system 104 sends the report (e.g., report 174) to a data store maintenance team. In response to determining that the priority (e.g., priority 176) is "High," the data monitoring system 104 generates an alert (e.g., alert 178) that the report (e.g., report 174) needs an immediate response, and sends the report (e.g., report 174) and the alert (e.g., alert 178) to the data store maintenance team.

The data monitoring system 104 determines whether to stop the degradation detection process. In certain embodiments, the data monitoring system 104 may determine to stop the degradation detection process in response to receiving an instruction (e.g., instruction 196) to stop the degradation detection process. In response to determining that the instruction (e.g., instruction 196) to stop the degradation detection process is not received, the degradation detection process is repeated until the instruction (e.g., instruction 196) to stop the degradation detection process is received.

In yet other embodiments, the data monitoring system 104 may be configured to perform a method for automated data item degradation detection. In operation, the data monitoring system 104 selects a data store (e.g., respective one of data stores 180-1 through 180-m) from a plurality of data stores 180, selects a log type from a plurality of log types of the selected data store, and analyzes a log of the selected log type. The data monitoring system 104 determines whether the log has a format of the selected log type. In response to determining that the log has the format of the selected log type, the data monitoring system 104 identifies the selected log type as not degraded. In response to determining that the log does not have the format of the selected log type, the data monitoring system 104 identifies the selected data store (e.g., data store 180-1) as a degraded, identifies the selected log type (e.g., log type 118-1) as a degraded, and determines an impact score (e.g., impact score 120-1) of the selected log type (e.g., log type 118-1).

The data monitoring system 104 determines whether all log types (e.g., log types 118-1 through 118-n) of the selected data store (e.g., data store 180-1) are analyzed. In response to determining that all log types (e.g., log types 118-1 through 118-n) of the selected data store (e.g., data store 180-1) are not analyzed, the process is repeated for all unanalyzed log type (e.g., respective one of log types 118-1 through 118-n) of the selected data store (e.g., data store 180-1) until all log types (e.g., log types 118-1 through 118-n) of the selected data store (e.g., data store 180-1) are analyzed. In response to determining that all log types (e.g., log types 118-1 through 118-n) of the selected data store (e.g., data store 180-1) are analyzed, the data monitoring system 104 analyzes a dependency information (e.g., dependency information 124-1) of the selected data store (e.g., data store 180-1) and determines whether one or more related data stores are identified for the selected data store. In response to determining that the one or more related data stores (e.g., data stores 180-5 and 180-6 or data stores 180-8 and 180-9) are identified for the selected data store (e.g., data store 180-4 or data store 180-7), the data monitoring system 104 selects a related data store from the one or more related data stores (e.g., data stores 180-5 and 180-6 or data stores 180-8 and 180-9).

The data monitoring system 104 identifies one or more paths connecting the selected data store to the selected related data store, selects a path of the one or more paths, and determines whether a source log type of the selected path is identified as degraded. In response to determining that the source log type of the selected path is identified as degraded, the data monitoring system 104 identifies a destination log type of the selected path as degraded and determines an impact score for the degraded destination log type. The data monitoring system 104 determines whether are all paths are analyzed. In response to determining that all paths are not analyzed, the process is repeated for all unanalyzed paths until all paths are analyzed. In response to determining that all paths are analyzed, the data monitoring system 104 identifies the selected related data store as degraded.

The data monitoring system 104 determines whether all related data stores are analyzed. In response to determining that all related data stores are not analyzed, the process is repeated for all unanalyzed related data store until all related data stores are analyzed. In response to determining that all related data stores are analyzed, the data monitoring system 104 determines whether all data stores (e.g., data stores 180) are analyzed. In response to determining that all data stores are not analyzed, the process is repeated for all unanalyzed data stores until all data stores are analyzed. In response to determining that all data stores are analyzed, the data monitoring system 104 generates a report (e.g., report 174). In certain embodiments, the report (e.g., report 174) comprises identifications of degraded data stores, identifications of degraded log types for each degraded data store, and impact scores of the degraded log types.

The data monitoring system 104 determines a priority (e.g., priority 176) of the report (e.g., report 174) and determines whether the priority (e.g., priority 176) is "High" or "Low." In response to determining that the priority (e.g., priority 176) is "Low," the data monitoring system 104 sends the report (e.g., report 174) to a data store maintenance team. In response to determining that the priority (e.g., priority 176) is "High," the data monitoring system 104 generates an alert (e.g., alert 178) that the report (e.g., report 174) needs an immediate response, and sends the report (e.g., report 174) and the alert (e.g., alert 178) to the data store maintenance team.

The data monitoring system 104 determines whether to stop the degradation detection process. In certain embodiments, the data monitoring system 104 may determine to stop the degradation detection process in response to receiving an instruction (e.g., instruction 196) to stop the degradation detection process. In response to determining that the instruction (e.g., instruction 196) to stop the degradation detection process is not received, the degradation detection process is repeated until the instruction (e.g., instruction 196) to stop the degradation detection process is received.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

Data Monitoring System

The data monitoring system 104 is generally any device that is configured to process data and communicate with other components of the system 100 via the network 102. The data monitoring system 104 may comprise a processor 106 in signal communication with a memory 110 and a network interface 108.

Processor 106 comprises one or more processors operably coupled to the memory 110. Processor 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 106 may be a programmable logic device, a microcontroller, a microprocessor, or any suitable combination of the preceding. The one or more processors are configured to process data and may be implemented in hardware or software. For example, processor 106 may be 8-bit, 16-bit, 32-bit, 64-bit, or of any other suitable architecture. The one or more processors are configured to implement various software instructions to perform the operations described herein. For example, the one or more processors are configured to execute software instructions 112 and perform one or more functions described herein.

Network interface 108 is configured to enable wired and/or wireless communications (e.g., via network 102). Network interface 108 is configured to communicate data between the data monitoring system 104 and other components of the system 100. For example, network interface 108 may comprise a WIFI interface, a local area network (LAN) interface, a wide area network (WAN) interface, a modem, a switch, or a router. Processor 106 is configured to send and receive data using network interface 108. Network interface 108 may be configured to use any suitable type of communication protocol as would be appreciated by one of ordinary skill in the art.

Memory 110 comprises a non-transitory computer-readable medium such as one or more disks, tape drives, or solid-state drives, and may be used as an over-flow data storage device, to store programs when such programs are selected for execution, and to store instructions and data that are read during program execution. Memory 110 may be volatile or non-volatile and may comprise a read-only memory (ROM), random-access memory (RAM), ternary content-addressable memory (TCAM), dynamic random-access memory (DRAM), and static random-access memory (SRAM). Memory 110 may be implemented using one or more disks, tape drives, solid-state drives, and/or the like. Memory 110 may store any of the information described in FIGS. 1, 2, 3A-3C, 4A-4C, and 5A-5C along with any other data, instructions, logic, rules, or code operable to implement the function(s) described herein. Memory 110 is operable to store software instructions 112 and/or any other data and instructions. Software instructions 112 may comprise any suitable set of software instructions, logic, rules, or code operable to be executed by processor 106.

In certain embodiments, memory 110 may further store a database 114 and a database 148. In other embodiments, the database 114 and the database 148 may be implemented using a single database. In other embodiments, the database 114 and the database 148 may not be parts of the data monitoring system 104 and may be implemented by individual computing systems. The database 114 may comprise data store profiles 116-1 through 116-$m$. The data store profiles 116-1 through 116-$m$ may correspond to or may be associated with data stores 180-1 through 180-$m$, respectively.

The data store profile 116-1 comprises log types 118-1 through 118-$n$. The corresponding data store 180-1 is configured to generated logs 190-1 through 190-$n$ of the log types 118-1 through 118-$n$, respectively. The data store profile 116-1 comprises impact scores 120-1 through 120-$m$ and formats 122-1 through 122-$m$ associated with the log types 118-1 through 118-$n$, respectively. In certain embodiments when the logs 190-1 through 190-$n$ of the log types 118-1 through 118-$n$ have a plurality of fields, each of the formats 122-1 through 122-$m$ comprises a plurality of formats associated with the plurality of fields. The data store profile 116-1 further comprises dependency information 124-1 for the data store 180-1. The dependency information 124-1 comprises one or more related data stores 126, which are related to the data store 180-1. The dependency information 124-1 further comprises one or more data paths 128 that operably connect or couple the one or more related data stores 126 to the data store 180-1. Each of the one or more data paths 128 may comprise one or more data pipelines 130. Each of the data pipelines 130 communicatively couples a respective pair of data stores, where a first one of the pair of data stores may be referred as to as a source data store and a second one of the pair of data store may be referred to as a destination data store. The dependency information 124-1 further comprises one or more time delays 132 associated with respective one or more data pipelines 130. Each of the one or more time delays 132 define a time interval within which the source data system is configured to receive a first log generated by a source system via a respective one of the data pipelines 130 and generate a second log based on the first log.

The data store profile 116-$m$ comprises log types 134-1 through 134-$k$. The corresponding data store 180-$m$ is configured to generated logs 192-1 through 192-$k$ of the log types 134-1 through 134-$k$, respectively. The data store profile 116-$m$ comprises impact scores 136-1 through 136-$k$ and formats 138-1 through 138-$k$ associated with the log types 134-1 through 134-$k$, respectively. In certain embodiments when the logs 192-1 through 192-$k$ of the log types 134-1 through 134-$k$ have a plurality of fields, each of the formats 138-1 through 138-$k$ comprises a plurality of formats associated with the plurality of fields. The data store profile 116-$m$ further comprises dependency information 124-$m$ for the data store 180-$m$. The dependency information 124-$m$ comprises one or more related data stores 140, which are related to the data store 180-$m$. The dependency information 124-$m$ further comprises one or more data paths 142 that operably connect or couple the one or more related data stores 140 to the data store 180-$m$. Each of the one or more data paths 142 may comprise one or more data pipelines 144. Each of the data pipelines 144 communicatively couples a respective pair of data stores, where a first one of the pair of data stores may be referred as to as a source data store and a second one of the pair of data store may be referred to as a destination data store. The dependency information 124-*m* further comprises one or more time delays 146 associated with respective one or more data pipelines 144. Each of the one or more time delays 146 define a time interval within which the source data system is configured to receive a first log generated by a source system via a respective one of the data pipelines 144 and generate a second log based on the first log.

The database 148 may comprise data store profiles 150-1 through 150-*m*. The data store profiles 150-1 through 150-*m* may correspond to or may be associated with data stores 180-1 through 180-*m*, respectively. The data store profile 150-1 comprises a plurality of numbers 152-1 through 152-*m*. The plurality of numbers 152-1 are associated with a plurality of timestamps 154-1. Each of the plurality of numbers 152-1 is a number of logs 190-1 of a log type 118-1 that were generated by the data store 180-1 at a time defined by a respective one of the timestamps 154-1 for a time interval 160. Each of the plurality of numbers 152-*n* is a number of logs 190-*n* of a log type 118-*n* that were generated by the data store 180-1 at a time defined by a respective one of the timestamps 154-*n* for the time interval 160.

The data store profile 150-*m* comprises a plurality of numbers 156-1 through 156-*k*. The plurality of numbers 156-1 are associated with a plurality of timestamps 158-1. Each of the plurality of numbers 156-1 is a number of logs 192-1 of a log type 134-1 that were generated by the data store 180-*m* at a time defined by a respective one of the timestamps 158-1 for the time interval 160. Each of the plurality of numbers 156-*k* is a number of logs 192-*k* of a log type 134-*k* that were generated by the data store 180-*m* at a time defined by a respective one of the timestamps 158-*k* for the time interval 160.

In certain embodiments, the data monitoring system 104 may be configured to perform a method for automated data source degradation detection. In operation, the data monitoring system 104 selects a data store (e.g., respective one of data stores 180-1 through 180-*m*) from a plurality of data stores 180. In certain embodiments when the plurality of data stores 180 comprise data stores 180-1 through 180-9 (see FIG. 2), the selected data store may be the data stores 180-1, 180-2, 180-4, or 180-7. The processor 106 of the data monitoring system 104 determines whether a maintenance notice (e.g., respective one of notices 194) is received for the selected data store. In response to determining that the maintenance notice (e.g., respective one of notices 194) is received for the selected data store, the processor 106 of the data monitoring system 104 identifies the selected data store as degraded and identifies log types of the selected data store as degraded. In certain embodiments when the selected data store is the data store 180-1, the processor 106 of the data monitoring system 104 may identify the log type 118-1 as degraded. In certain embodiments when the selected data store is the data store 180-2, the processor 106 of the data monitoring system 104 may identify the log type 204-2 as degraded. In certain embodiments when the selected data store is the data store 180-4, the processor 106 of the data monitoring system 104 may identify the log type 204-4 as degraded. In certain embodiments when the selected data store is the data store 180-7, the processor 106 of the data monitoring system 104 may identify the log type 204-7 as degraded. The processor 106 of the data monitoring system 104 determines impact scores of the degraded log types of the selected data store. In certain embodiments when the degraded log type of the selected data store is the log type 118-1 of the data store 180-1, the processor 106 of the data monitoring system 104 determines an impact score 120-1 associated with the log type 118-1 as the impact score of the degraded log type of the selected data store.

In response to determining that a maintenance notice (e.g., respective one of notices 194) is not received for the selected data store, the processor 106 of the data monitoring system 104 selects a log type from a plurality of log types of the selected data store. In certain embodiments when the selected data store is the data store 180-1, the processor 106 of the data monitoring system 104 may select the log type 118-1. In certain embodiments when the selected data store is the data store 180-2, the processor 106 of the data monitoring system 104 may select the log type 204-2. In certain embodiments when the selected data store is the data store 180-4, the processor 106 of the data monitoring system 104 may select the log type 204-4. In certain embodiments when the selected data store is the data store 180-7, the processor 106 of the data monitoring system 104 may select the log type 204-7.

The processor 106 of the data monitoring system 104 determines a number (e.g., number 166) of logs (e.g., logs 190-1, 202-2, 202-4, or 202-7) of the selected log type (e.g., log types 118-1, 204-2, 204-4, or 204-7) that is generated by the selected data store (e.g., data stores 180-1, 180-2, 180-4, or 180-7) at a first time (e.g., time 170) for a time interval (e.g., time interval 160). The processor 106 of the data monitoring system 104 determines a baseline number (e.g., baseline number 162A) and a threshold value (e.g., threshold 164A) for the selected log type (e.g., log types 118-1, 204-2, 204-4, or 204-7). In certain embodiments, the processor 106 of the data monitoring system 104 determines the baseline number (e.g., baseline number 162A) and the threshold value (e.g., threshold 164A) for the selected log type (e.g., log type 118-1) based on a plurality of numbers (e.g., plurality of numbers 152-1) for the selected log type (e.g., log type 118-1). The baseline number (e.g., baseline number 162A) is an expected number of logs (e.g., logs 190-1) of the selected log type (e.g., log type 118-1) to be generated by the selected data store (e.g., data store 180-1) at the first time (e.g., time 170) for the time interval (e.g., time interval 160).

The processor 106 of the data monitoring system 104 compares the number (e.g., number 166) of logs (e.g., logs 190-1) of the selected log type (e.g., log type 118-1) to the baseline number (e.g., baseline number 162A) and determines whether the number (e.g., number 166) of logs (e.g., logs 190-1) of the selected log type (e.g., log type 118-1) differs from the baseline number (e.g., baseline number 162A) by more than the threshold value (e.g., threshold 164A). In response to determining that the number (e.g., number 166) of logs (e.g., logs 190-1) of the selected log type (e.g., log type 118-1) does not differ from the baseline number (e.g., baseline number 162A) by more than the threshold value (e.g., threshold 164A), the processor 106 of the data monitoring system 104 identifies the selected log type (e.g., log type 118-1) as not degraded and saves the number (e.g., number 166) of logs (e.g., logs 190-1) of the selected log type (e.g., log type 118-1) in the data store profile (e.g., data store profile 116-1) of the selected data store (e.g., data store 180-1).

In response to determining that the number (e.g., number 166) of logs (e.g., logs 190-1) of the selected log type (e.g., log type 118-1) differs from the baseline number (e.g., baseline number 162A) by more than the threshold value (e.g., threshold 164A), the processor 106 of the data monitoring system 104 identifies the selected data store (e.g., data store 180-1) as a degraded, identifies the selected log type (e.g., log type 118-1) as a degraded, and determines an impact score (e.g., impact score 120-1) of the selected log type (e.g., log type 118-1). In certain embodiments, the processor 106 of the data monitoring system 104 may determine the impact score (e.g., impact score 120-1) of the selected log type (e.g., log type 118-1) from the data store profile (e.g., data store profile 116-1) of the selected data store (e.g., data store 180-1). The processor 106 of the data monitoring system 104 determines whether all log types (e.g., log types 118-1 through 118-n) of the selected data store (e.g., data store 180-1) are analyzed. In response to determining all log types (e.g., log types 118-1 through 118-n) of the selected data store (e.g., data store 180-1) are not analyzed, the process is repeated for all unanalyzed log types until all log types (e.g., log types 118-1 through 118-n) of the selected data store (e.g., data store 180-1) are analyzed.

In response to determining that all log types (e.g., log types 118-1 through 118-n) of the selected data store (e.g., data store 180-1) are analyzed, the processor 106 of the data monitoring system 104 analyzes a dependency information (e.g., dependency information 124-1) of the selected data store (e.g., data store 180-1) and determines whether one or more related data stores are identified for the selected data store. In certain embodiments when the selected data store is the data store 180-1, the processor 106 of the data monitoring system 104 determines that no related data stores are identified for the selected data store. In certain embodiments when the selected data store is the data store 180-2, the processor 106 of the data monitoring system 104 identifies the data store 180-3 as a related data store for the selected data store. In certain embodiments when the selected data store is the data store 180-4, the processor 106 of the data monitoring system 104 identifies the data stores 180-5 and 180-6 as related data stores for the selected data store. In certain embodiments when the selected data store is the data store 180-7, the processor 106 of the data monitoring system 104 identifies the data stores 180-8 and 180-9 as related data stores for the selected data store.

In response to determining that the one or more related data stores (e.g., data stores 180-5 and 180-6 or data stores 180-8 and 180-9) are identified for the selected data store (e.g., data store 180-4 or data store 180-7), the processor 106 of the data monitoring system 104 selects a related data store from the one or more related data stores (e.g., data stores 180-5 and 180-6 or data stores 180-8 and 180-9) and identifies one or more paths connecting the selected data store to the selected related data store. In certain embodiments when the selected data store is the data store 180-2 and the selected related data store is the data store 180-3, the processor 106 of the data monitoring system 104 identifies the pipeline 206-1 as a path connecting the selected data store to the selected related data store. In certain embodiments when the selected data store is the data store 180-4 and the selected related data store is the data store 180-5, the processor 106 of the data monitoring system 104 identifies the pipeline 206-2 as a path connecting the selected data store to the selected related data store. In certain embodiments when the selected data store is the data store 180-4 and the selected related data store is the data store 180-6, the processor 106 of the data monitoring system 104 identifies the pipeline 206-3 as a path connecting the selected data store to the selected related data store. In certain embodiments when the selected data store is the data store 180-7 and the selected related data store is the data store 180-8, the processor 106 of the data monitoring system 104 identifies the pipeline 206-4 as a path connecting the selected data store to the selected related data store. In certain embodiments when the selected data store is the data store 180-7 and the selected related data store is the data store 180-9, the processor 106 of the data monitoring system 104 identifies the pipelines 206-4 and 206-5 as a path connecting the selected data store to the selected related data store.

The processor 106 of the data monitoring system 104 selects a path of the one or more paths and determines whether a source log type of the selected path is identified as degraded. In certain embodiments when the selected path comprises the pipeline 206-1, the processor 106 of the data monitoring system 104 determines whether a source log type 204-2 is identified as degraded. In certain embodiments when the selected path comprises the pipelines 206-2 or 206-3, the processor 106 of the data monitoring system 104 determines whether a source log type 204-4 is identified as degraded. In certain embodiments when the selected path comprises the pipeline 206-4 or pipelines 206-4 and 206-5, the processor 106 of the data monitoring system 104 determines whether a source log type 204-7 is identified as degraded.

In response to determining that the source log type of the selected path is identified as degraded, the processor 106 of the data monitoring system 104 identifies a destination log type of the selected path as degraded. In certain embodiments when the selected path comprises the pipeline 206-1, the processor 106 of the data monitoring system 104 identifies a destination log type 204-3 as degraded. In certain embodiments when the selected path comprises the pipelines 206-2, the processor 106 of the data monitoring system 104 identifies a destination log type 204-5 as degraded. In certain embodiments when the selected path comprises the pipelines 206-3, the processor 106 of the data monitoring system 104 identifies a destination log type 204-6 as degraded. In certain embodiments when the selected path comprises the pipeline 206-4, the processor 106 of the data monitoring system 104 identifies a destination log type 204-8 as degraded. In certain embodiments when the selected path comprises the pipelines 206-4 and 206-5, the processor 106 of the data monitoring system 104 identifies a destination log type 134-1 as degraded.

The processor 106 of the data monitoring system 104 determines an impact score for the degraded destination log type. For example, when the degraded destination log type comprises the log type 134-1, the processor 106 of the data monitoring system 104 determines the impact score 136-1 as an impact score for the degraded destination log type. The processor 106 of the data monitoring system 104 determines whether are all paths are analyzed. In response to determining that all paths are not analyzed, the process is repeated for all unanalyzed paths until all paths are analyzed. In response to determining that all paths are analyzed, the processor 106 of the data monitoring system 104 identifies the selected related data store as degraded. In certain embodiments when the selected data store comprises the data store 180-2, the processor 106 of the data monitoring system 104 identifies the selected related data store 180-3 as degraded. In certain embodiments when the selected data store comprises the data store 180-4, the processor 106 of the data monitoring system 104 identifies the selected related data stores 180-5 or 180-6 as degraded. In certain embodiments when the selected data store comprises the data store 180-7, the processor 106 of the data monitoring system 104 identifies the selected related data stores 180-8 or 180-9 as degraded.

The processor 106 of the data monitoring system 104 determines whether all related data stores are analyzed. In response to determining that all related data stores are not analyzed, the process is repeated for all unanalyzed related data stores until all related data stores are analyzed. In response to determining that all related data stores are analyzed, the processor 106 of the data monitoring system 104 determines whether all data stores (e.g., data stores 180) are analyzed. In response to determining that all data stores are not analyzed, the process is repeated for all unanalyzed data stores until all data stores are analyzed. In response to determining that all data stores are analyzed, the processor 106 of the data monitoring system 104 generates a report (e.g., report 174). In certain embodiments, the report (e.g., report 174) comprises identifications of degraded data stores, identifications of degraded log types for each degraded data stores, and impact scores of the degraded log types. In certain embodiments when a maintenance notice is received for a data store, the report (e.g., report 174) further comprises an identification that the data store is degraded due to maintenance.

The processor 106 of the data monitoring system 104 determines a priority (e.g., priority 176) of the report (e.g., report 174). In certain embodiments, the processor 106 of the data monitoring system 104 determines the priority (e.g., priority 176) of the report (e.g., report 174) based at least in part on the impact scores of the degraded log types. The processor 106 of the data monitoring system 104 determines whether the priority (e.g., priority 176) is "High" or "Low." In response to determining at that the priority (e.g., priority 176) is "Low," the processor 106 of the data monitoring system 104 sends the report (e.g., report 174) to a data store maintenance team. In response to determining the priority (e.g., priority 176) is "High," the processor 106 of the data monitoring system 104 generates an alert (e.g., alert 178) that the report (e.g., report 174) needs an immediate response, and sends the report (e.g., report 174) and the alert (e.g., alert 178) to the data store maintenance team.

The processor 106 of the data monitoring system 104 determines whether to stop the degradation detection process. In certain embodiments, the processor 106 of the data monitoring system 104 may determine to stop the degradation detection process in response to receiving an instruction (e.g., instruction 196) to stop the degradation detection process. In response to determining that the instruction (e.g., instruction 196) to stop the degradation detection process is not received, the degradation detection process is repeated until the instruction (e.g., instruction 196) to stop the degradation detection process is received.

In other embodiments, the data monitoring system 104 may be configured to perform a method for automated data pipeline degradation detection. In operation, the data monitoring system 104 analyzes dependency information (e.g., dependency information 124-1 through 124-*m*) of a plurality of data stores 180 (e.g., data stores 180-1 through 180-*m*) and identifies one or more data pipelines based on the dependency information (e.g., dependency information 124-1 through 124-*m*). In certain embodiments, when the plurality of data stores 180 comprises the data stores 180-1 through 180-9 (see FIG. 2), one or more data pipelines may comprise data pipelines 206-1 through 206-5. The processor 106 of the data monitoring system 104 selects a data pipeline. In certain embodiments, the data pipeline may be any of the data pipelines 206-1 through 206-4. At operation 408, the processor 106 of the data monitoring system 104 determines a time delay of the selected data pipeline. In certain embodiments when the data pipeline is the data pipeline 206-1, the data pipeline 206-2, the data pipeline 206-3, or the data pipeline 206-4, the time delay is a time delay 208-1, a time delay 208-2, a time delay 208-3, or a time delay 208-4, respectively.

The processor 106 of the data monitoring system 104 identifies a source data store and a source log type of the selected data pipeline. In certain embodiments when the selected data pipeline is the data pipeline 206-1, the processor 106 of the data monitoring system 104 identifies the data store 180-2 as the source data store and the log type 204-2 as the source log type. In certain embodiments when the selected data pipeline is the data pipeline 206-2, the processor 106 of the data monitoring system 104 identifies the data store 180-4 as the source data store and the log type 204-4 as the source log type. In certain embodiments when the selected data pipeline is the data pipeline 206-3, the processor 106 of the data monitoring system 104 identifies the data store 180-4 as the source data store and the log type 204-4 as the source log type. In certain embodiments when the selected data pipeline is the data pipeline 206-4, the processor 106 of the data monitoring system 104 identifies the data store 180-7 as the source data store and the log type 204-7 as the source log type.

The processor 106 of the data monitoring system 104 identifies a destination data store and a destination log type of the selected data pipeline. In certain embodiments when the selected data pipeline is the data pipeline 206-1, the processor 106 of the data monitoring system 104 identifies the data store 180-3 as the destination data store and the log type 204-3 as the destination log type. In certain embodiments when the selected data pipeline is the data pipeline 206-2, the processor 106 of the data monitoring system 104 identifies the data store 180-5 as the destination data store and the log type 204-5 as the destination log type. In certain embodiments when the selected data pipeline is the data pipeline 206-3, the processor 106 of the data monitoring system 104 identifies the data store 180-6 as the destination data store and the log type 204-6 as the destination log type. In certain embodiments when the selected data pipeline is the data pipeline 206-4, the processor 106 of the data monitoring system 104 identifies the data store 180-8 as the destination data store and the log type 204-8 as the destination log type.

The processor 106 of the data monitoring system 104 determines a first number of logs (e.g., number 166) of the source log type that is generated by the source data store at a first time (e.g., time 170) for a time interval (e.g., time interval 160) and determines a first baseline number (e.g., baseline number 162A) and a first threshold value (e.g., threshold 164A) for the source log type. In certain embodiments, the processor 106 of the data monitoring system 104 determines the first baseline number (e.g., baseline number 162A) and the first threshold value (e.g., threshold 164A) for the source log type based on a plurality of numbers for the source log type (e.g., log types 204-2, 204-4, or 204-7). In certain embodiments, the first baseline number (e.g., baseline number 162A) is an expected number of logs (e.g., logs 202-2, 202-4, or 202-7) of the source log type (e.g., log types 204-2, 204-4, or 204-7) to be generated by the source data store (e.g., data stores 180-2, 180-4, or 180-7) at the first time (e.g., time 170) for the time interval (e.g., time interval 160).

The processor 106 of the data monitoring system 104 compares the first number of logs (e.g., number 166) of the source log type (e.g., log types 204-2, 204-4, or 204-7) to the first baseline number (e.g., baseline number 162A) and determines whether the first number of logs (e.g., number 166) of the source log type (e.g., log types 204-2, 204-4, or 204-7) differs from the first baseline number (e.g., baseline number 162A) by less than the first threshold value (e.g., threshold 164A). In response to determining that the first number of logs (e.g., number 166) of the source log type (e.g., log types 204-2, 204-4, or 204-7) differs from the first baseline number (e.g., baseline number 162A) by less than the first threshold value (e.g., threshold 164A), the processor 106 of the data monitoring system 104 determines a second number of logs (e.g., number 168) of the destination log type (e.g., log types 204-3, 204-5, 204-6, or 204-8) that is generated by the destination data store (e.g., data stores 180-3, 180-5, 180-6, or 180-8) at a second time (e.g., time 172) for the time interval (e.g., time interval 160). In certain embodiments, the second time (e.g., time 172) is later than the first time (e.g., time 170) by the time delay (e.g., time delays 208-1, 208-2, 208-3, or 208-4). The processor 106 of the data monitoring system 104 determines a second baseline number (e.g., baseline number 162B) and a second threshold value (e.g., threshold 164B) for the destination log type (e.g., log types 204-3, 204-5, 204-6, or 204-8). In certain embodiments, the processor 106 of the data monitoring system 104 determines the second baseline number (e.g., baseline number 162B) and the second threshold value (e.g., threshold 164B) for the destination log type (e.g., log types 204-3, 204-5, 204-6, or 204-8) based on a plurality of numbers for the destination log type (e.g., log types 204-3, 204-5, 204-6, or 204-8). In certain embodiments, the second baseline number (e.g., baseline number 162B) is an expected number of logs (e.g., logs 202-3, 202-5, 202-6, or 202-8) of the destination log type (e.g., log types 204-3, 204-5, 205-6, or 204-8) to be generated by the destination data store (e.g., data stores 180-3, 180-5, 180-6, or 180-8) at the second time (e.g., time 172) for the time interval (e.g., time interval 160).

The processor 106 of the data monitoring system 104 compares the second number of logs (e.g., number 168) of the destination log type (e.g., log types 204-3, 204-5, 205-6, or 204-8) to the second baseline number (e.g., baseline number 162B) and determines whether the second number of logs (e.g., number 168) of the destination log type (e.g., log types 204-3, 204-5, 205-6, or 204-8) differs from the second baseline number (e.g., baseline number 162B) by more than the second threshold value (e.g., threshold 164B).

In response to determining that the second number of logs (e.g., number 168) of the destination log type (e.g., log types 204-3, 204-5, 205-6, or 204-8) does not differ from the second baseline number (e.g., baseline number 162B) by more than the second threshold value (e.g., threshold 164B), the processor 106 of the data monitoring system 104 identifies the selected data pipeline (e.g., data pipelines 206-1, 206-2, 206-3, or 206-4) as not degraded. In response to determining that the second number of logs (e.g., number 168) of the destination log type (e.g., log types 204-3, 204-5, 205-6, or 204-8) differs from the second baseline number (e.g., baseline number 162B) by more than the second threshold value (e.g., threshold 164B), the processor 106 of the data monitoring system 104 identifies the selected data pipeline (e.g., data pipelines 206-1, 206-2, 206-3, or 206-4) as degraded, identifies the destination data store (e.g., data stores 180-3, 180-5, 180-6, or 180-8) of the selected data pipeline (e.g., data pipelines 206-1, 206-2, 206-3, or 206-4) as degraded, identifies the destination log type (e.g., log types 204-3, 204-5, 205-6, or 204-8) of the selected data pipeline (e.g., data pipelines 206-1, 206-2, 206-3, or 206-4) as degraded, and determines an impact score (e.g., respective one of impact scores 120-1 through 120-n and 136-1 through 136-k) of the degraded destination log type (e.g., log types 204-3, 204-5, 205-6, or 204-8) of the selected data pipeline (e.g., log types 204-3, 204-5, 205-6, or 204-8).

The processor 106 of the data monitoring system 104 analyzes a dependency information (e.g., respective one of dependency information 124-1 through 124-m) of the destination data store (e.g., data stores 180-3, 180-5, 180-6, or 180-8) of the selected data pipeline (e.g., data pipelines 206-1, 206-2, 206-3, or 206-4) and determines whether one or more related data stores are identified for the destination data store (e.g., data stores 180-3, 180-5, 180-6, or 180-8). In certain embodiments when the destination data store is the data store 180-3, the data store 180-5, or the data store 180-6, the processor 106 of the data monitoring system 104 determines that no related data stores are identified for the destination data store. In certain embodiments when the destination data store is the data store 180-8, the processor 106 of the data monitoring system 104 identifies the data store 180-9 as the related data store for the destination data store.

In response to determining that the one or more related data stores (e.g., data store 180-9) are identified for the destination data store (e.g., data store 180-7), the processor 106 of the data monitoring system 104 selects a related data store (e.g., data store 180-9) from the one or more related data stores and identifies one or more paths connecting the destination data store (e.g., data store 180-8) to the selected related data store (e.g., data store 180-9). In certain embodiments when the destination data store is the data store 180-8 and the selected related data store is the data store 180-9, the processor 106 of the data monitoring system 104 identifies the pipeline 206-5 as a path connecting the destination data store to the selected related data store. The processor 106 of the data monitoring system 104 selects a path (e.g., pipeline 206-5) from the one or more paths and determines whether a source log type (e.g., log type 204-8) of the selected path (e.g., pipeline 206-5) is identified as degraded. In response to determining that the source log type (e.g., log type 204-8) of the selected path (e.g., pipeline 206-5) is identified as degraded, the processor 106 of the data monitoring system 104 identifies a destination log type (e.g., log type 134-1) of the selected path (e.g., pipeline 206-5) as degraded and determines an impact score (e.g., the impact score 136-1) for the destination log type (e.g., log type 134-1) of the selected path (e.g., pipeline 206-5).

The processor 106 of the data monitoring system 104 determines whether are all paths are analyzed. In response to determining that all paths are not analyzed, the process is repeated for all unanalyzed paths until all paths are analyzed. In response to determining that all paths are analyzed, the processor 106 of the data monitoring system 104 identifies the selected related data store (e.g., data store 180-9) as degraded. The processor 106 of the data monitoring system 104 determines whether all related data stores are analyzed. In response to determining that all related data stores are not analyzed, the process is repeated for all unanalyzed related data stores until all related data stores are analyzed. In response to determining that all related data stores are analyzed, the processor 106 of the data monitoring system 104 determines whether all data pipelines are analyzed. In response to determining that all data pipelines are not analyzed, the process is repeated for all unanalyzed data pipelines until all data pipelines are analyzed.

In response to determining that all data pipelines are analyzed, the processor 106 of the data monitoring system 104 generates a report (e.g., report 174). In certain embodiments, the report (e.g., report 174) comprises identification of degraded data pipelines, identifications of degraded data stores, identifications of degraded log types for each degraded data stores, and impact scores of the degraded log types. The processor 106 of the data monitoring system 104 determines a priority (e.g., priority 176) of the report (e.g., report 174). In certain embodiments, the processor 106 of the data monitoring system 104 determines the priority (e.g., priority 176) of the report (e.g., report 174) based at least in part on the impact scores of the degraded log types. The processor 106 of the data monitoring system 104 determines whether the priority (e.g., priority 176) is "High" or "Low." In response to determining that the priority (e.g., priority 176) is "Low," the processor 106 of the data monitoring system 104 sends the report (e.g., report 174) to a data store maintenance team. In response to determining that the priority (e.g., priority 176) is "High," the processor 106 of the data monitoring system 104 generates an alert (e.g., alert 178) that the report (e.g., report 174) needs an immediate response and sends the report (e.g., report 174) and the alert (e.g., alert 178) to the data store maintenance team.

The processor 106 of the data monitoring system 104 determines whether to stop the degradation detection process. In certain embodiments, the processor 106 of the data monitoring system 104 may determine to stop the degradation detection process in response to receiving an instruction (e.g., instruction 196) to stop the degradation detection process. In response to determining that the instruction (e.g., instruction 196) to stop the degradation detection process is not received, the degradation detection process is repeated until the instruction (e.g., instruction 196) to stop the degradation detection process is received.

In yet other embodiments, the data monitoring system 104 may be configured to perform a method for automated data item degradation detection. In operation, the processor 106 of the data monitoring system 104 selects a data store (e.g., respective one of data stores 180-1 through 180-m) from a plurality of data stores 180. In certain embodiments when the plurality of data stores 180 comprise data stores 180-1 through 180-9 (see FIG. 2), the selected data store may be the data stores 180-1, 180-2, 180-4, or 180-7.

The processor 106 of the data monitoring system 104 selects a log type from a plurality of log types of the selected data store. In certain embodiments when the selected data store is the data store 180-1, the processor 106 of the data monitoring system 104 may select the log type 118-1. In certain embodiments when the selected data store is the data store 180-2, the processor 106 of the data monitoring system 104 may select the log type 204-2. In certain embodiments when the selected data store is the data store 180-4, the processor 106 of the data monitoring system 104 may select the log type 204-4. In certain embodiments when the selected data store is the data store 180-7, the processor 106 of the data monitoring system 104 may select the log type 204-7.

The processor 106 of the data monitoring system 104 analyzes a log of the selected log type. In certain embodiments when the selected log type is the log type 118-1, the processor 106 of the data monitoring system 104 analyzes a log 190-1. In certain embodiments when the selected log type is the log type 204-2, the processor 106 of the data monitoring system 104 analyzes a log 202-2. In certain embodiments when the selected log type is the log type 204-4, the processor 106 of the data monitoring system 104 analyzes a log 202-4. In certain embodiments when the selected log type is the log type 204-7, the processor 106 of the data monitoring system 104 analyzes a log 202-7.

The processor 106 of the data monitoring system 104 determines whether the log has a format of the selected log type. In certain embodiments when the selected log type is the log type 118-1, the processor 106 of the data monitoring system 104 determines whether the log 190-1 has the format 122-1 of the selected log type 118-1. In response to determining that the log has the format of the selected log type, the processor 106 of the data monitoring system 104 identifies the selected log type as not degraded. In response to determining that the log does not have the format of the selected log type, the processor 106 of the data monitoring system 104 identifies the selected data store (e.g., data store 180-1) as a degraded, identifies the selected log type (e.g., log type 118-1) as a degraded, and determines an impact score (e.g., impact score 120-1) of the selected log type (e.g., log type 118-1). In certain embodiments, the processor 106 of the data monitoring system 104 may determine the impact score (e.g., impact score 120-1) of the selected log type (e.g., log type 118-1) from the data store profile (e.g., data store profile 116-1) of the selected data store (e.g., data store 180-1).

The processor 106 of the data monitoring system 104 determines whether all log types (e.g., log types 118-1 through 118-n) of the selected data store (e.g., data store 180-1) are analyzed. In response to determining that all log types (e.g., log types 118-1 through 118-n) of the selected data store (e.g., data store 180-1) are not analyzed, the process is repeated for all unanalyzed log type (e.g., respective one of log types 118-1 through 118-n) of the selected data store (e.g., data store 180-1) until all log types (e.g., log types 118-1 through 118-n) of the selected data store (e.g., data store 180-1) are analyzed.

In response to determining that all log types (e.g., log types 118-1 through 118-n) of the selected data store (e.g., data store 180-1) are analyzed, the processor 106 of the data monitoring system 104 analyzes a dependency information (e.g., dependency information 124-1) of the selected data store (e.g., data store 180-1). In certain embodiments, the dependency information (e.g., dependency information 124-1) of the selected data store (e.g., data store 180-1) is stored in the data store profile (e.g., data store profile 116-1) of the selected data store (e.g., data store 180-1). The processor 106 of the data monitoring system 104 determines whether one or more related data stores are identified for the selected data store. In certain embodiments when the selected data store is the data store 180-1, the processor 106 of the data monitoring system 104 determines that no related data stores are identified for the selected data store. In certain embodiments when the selected data store is the data store 180-2, the processor 106 of the data monitoring system 104 identifies the data store 180-3 as a related data store for the selected data store. In certain embodiments when the selected data store is the data store 180-4, the processor 106 of the data monitoring system 104 identifies the data stores 180-5 and 180-6 as related data stores for the selected data store. In certain embodiments when the selected data store is the data store 180-7, the processor 106 of the data monitoring system 104 identifies the data stores 180-8 and 180-9 as related data stores for the selected data store. In response to determining that the one or more related data stores (e.g., data stores 180-5 and 180-6 or data stores 180-8 and 180-9) are identified for the selected data store (e.g., data store 180-4 or data store 180-7), the processor 106 of the data monitoring system 104 selects a related data store from the one or more related data stores (e.g., data stores 180-5 and 180-6 or data stores 180-8 and 180-9).

The processor 106 of the data monitoring system 104 identifies one or more paths connecting the selected data store to the selected related data store. In certain embodiments when the selected data store is the data store 180-2 and the selected related data store is the data store 180-3, the processor 106 of the data monitoring system 104 identifies the pipeline 206-1 as a path connecting the selected data store to the selected related data store. In certain embodiments when the selected data store is the data store 180-4 and the selected related data store is the data store 180-5, the processor 106 of the data monitoring system 104 identifies the pipeline 206-2 as a path connecting the selected data store to the selected related data store. In certain embodiments when the selected data store is the data store 180-4 and the selected related data store is the data store 180-6, the processor 106 of the data monitoring system 104 identifies the pipeline 206-3 as a path connecting the selected data store to the selected related data store. In certain embodiments when the selected data store is the data store 180-7 and the selected related data store is the data store 180-8, the processor 106 of the data monitoring system 104 identifies the pipeline 206-4 as a path connecting the selected data store to the selected related data store. In certain embodiments when the selected data store is the data store 180-7 and the selected related data store is the data store 180-9, the processor 106 of the data monitoring system 104 identifies the pipelines 206-4 and 206-5 as a path connecting the selected data store to the selected related data store.

The processor 106 of the data monitoring system 104 selects a path of the one or more paths and determines whether a source log type of the selected path is identified as degraded. In certain embodiments when the selected path comprises the pipeline 206-1, the processor 106 of the data monitoring system 104 determines whether a source log type 204-2 is identified as degraded. In certain embodiments when the selected path comprises the pipelines 206-2 or 206-3, the processor 106 of the data monitoring system 104 determines whether a source log type 204-4 is identified as degraded. In certain embodiments when the selected path comprises the data pipeline 206-4 or data pipelines 206-4 and 206-5, the processor 106 of the data monitoring system 104 determines whether a source log type 204-7 is identified as degraded.

In response to determining that the source log type of the selected path is identified as degraded, the processor 106 of the data monitoring system 104 identifies a destination log type of the selected path as degraded. In certain embodiments when the selected path comprises the pipeline 206-1, the processor 106 of the data monitoring system 104 identifies a destination log type 204-3 as degraded. In certain embodiments when the selected path comprises the pipelines 206-2, the processor 106 of the data monitoring system 104 identifies a destination log type 204-5 as degraded. In certain embodiments when the selected path comprises the pipelines 206-3, the processor 106 of the data monitoring system 104 identifies a destination log type 204-6 as degraded. In certain embodiments when the selected path comprises the pipeline 206-4, the processor 106 of the data monitoring system 104 identifies a destination log type 204-8 as degraded. In certain embodiments when the selected path comprises the pipelines 206-4 and 206-5, the processor 106 of the data monitoring system 104 identifies a destination log type 134-1 as degraded. The processor 106 of the data monitoring system 104 determines an impact score for the degraded destination log type. For example, when the degraded destination log type comprises the log type 134-1, the processor 106 of the data monitoring system 104 determines the impact score 136-1 as an impact score for the degraded destination log type.

The processor 106 of the data monitoring system 104 determines whether are all paths are analyzed. In response to determining that all paths are not analyzed, the process is repeated for all unanalyzed paths until all paths are analyzed. In response to determining that all paths are analyzed, the processor 106 of the data monitoring system 104 identifies the selected related data store as degraded. In certain embodiments when the selected data store comprises the data store 180-2, the processor 106 of the data monitoring system 104 identifies the selected related data store 180-3 as degraded. In certain embodiments when the selected data store comprises the data store 180-4, the processor 106 of the data monitoring system 104 identifies the selected related data stores 180-5 or 180-6 as degraded. In certain embodiments when the selected data store comprises the data store 180-7, the processor 106 of the data monitoring system 104 identifies the selected related data stores 180-8 or 180-9 as degraded.

The processor 106 of the data monitoring system 104 determines whether all related data stores are analyzed. In response to determining that all related data stores are not analyzed, the process is repeated for all unanalyzed related data store until all related data stores are analyzed. In response to determining that all related data stores are analyzed, the processor 106 of the data monitoring system 104 determines whether all data stores (e.g., data stores 180) are analyzed. In response to determining that all data stores are not analyzed, the process is repeated for all unanalyzed data stores until all data stores are analyzed. In response to determining that all data stores are analyzed, the processor 106 of the data monitoring system 104 generates a report (e.g., report 174). In certain embodiments, the report (e.g., report 174) comprises identifications of degraded data stores, identifications of degraded log types for each degraded data store, and impact scores of the degraded log types.

The processor 106 of the data monitoring system 104 determines a priority (e.g., priority 176) of the report (e.g., report 174). In certain embodiments, the processor 106 of the data monitoring system 104 determines the priority (e.g., priority 176) of the report (e.g., report 174) based at least in part on the impact scores of the degraded log types. The processor 106 of the data monitoring system 104 determines whether the priority (e.g., priority 176) is "High" or "Low." In response to determining that the priority (e.g., priority 176) is "Low," the processor 106 of the data monitoring system 104 sends the report (e.g., report 174) to a data store maintenance team. In response to determining that the priority (e.g., priority 176) is "High," the processor 106 of the data monitoring system 104 generates an alert (e.g., alert 178) that the report (e.g., report 174) needs an immediate response and sends the report (e.g., report 174) and the alert (e.g., alert 178) to the data store maintenance team.

The processor 106 of the data monitoring system 104 determines whether to stop the degradation detection process. In certain embodiments, the processor 106 of the data monitoring system 104 may determine to stop the degradation detection process in response to receiving an instruction (e.g., instruction 196) to stop the degradation detection process. In response to determining that the instruction (e.g., instruction 196) to stop the degradation detection process is not received, the degradation detection process is repeated until the instruction (e.g., instruction 196) to stop the degradation detection process is received.

Data Stores

Each of the data stores 180-1 through 180-m is generally any device that is configured to process data and communicate with other components of the system 100 via the network 102. Each of the data stores 180-1 through 180-*m* comprises a respective one of processors 182-1 through 182-*m* in signal communication with a respective one of memories 186-1 through 186-*m* and a respective one of network interfaces 184-1 through 184-*m*. Each of the processors 182-1 through 182-*m* may comprise one or more processors operably coupled to a respective one of the memories 186-1 through 186-*m*.

Each of the processors 182-1 through 182-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 182-1 through 182-*m* may be a programmable logic device, a microcontroller, a microprocessor, or any suitable combination of the preceding. The one or more processors are configured to process data and may be implemented in hardware or software. For example, each of the processors 182-1 through 182-*m* may be 8-bit, 16-bit, 32-bit, 64-bit, or of any other suitable architecture. Each of the processors 182-1 through 182-*m* is configured to implement various software instructions. For example, each of the processors 182-1 through 182-*m* is configured to execute respective ones of software instructions 188-1 through 188-*m* that are stored in a respective one of the memories 186-1 through 186-*m* in order to perform the operations described herein.

Each of the network interfaces 184-1 through 184-*m* is configured to enable wired and/or wireless communications (e.g., via network 102). Each of the network interfaces 184-1 through 184-*m* is configured to communicate data between a respective one of the data stores 180-1 through 180-*m* and other components of the system 100. For example, each of the network interfaces 184-1 through 184-*m* may comprise a WIFI interface, a local area network (LAN) interface, a wide area network (WAN) interface, a modem, a switch, or a router. Each of the network interfaces 184-1 through 184-*m* may be configured to use any suitable type of communication protocol as would be appreciated by one of ordinary skill in the art.

Each of the memories 186-1 through 186-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 186-1 through 186-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 186-1 through 186-*m* may be implemented using one or more disks, tape drives, solid-state drives, and/or the like. Each of the memories may store any of the information described in FIGS. 1, 2, 3A-3C, 4A-4C, and 5A-5C along with any other data, instructions, logic, rules, or code operable to implement the function(s) described herein. Each of the memories 186-1 through 186-*m* is operable to store respective ones of software instructions 188-1 through 188-*m*, and/or any other data and instructions. Each of the software instructions 188-1 through 188-*m* may comprise any suitable set of software instructions, logic, rules, or code operable to be executed by respective one of the processors 182-1 through 182-*m*.

Figure 2:
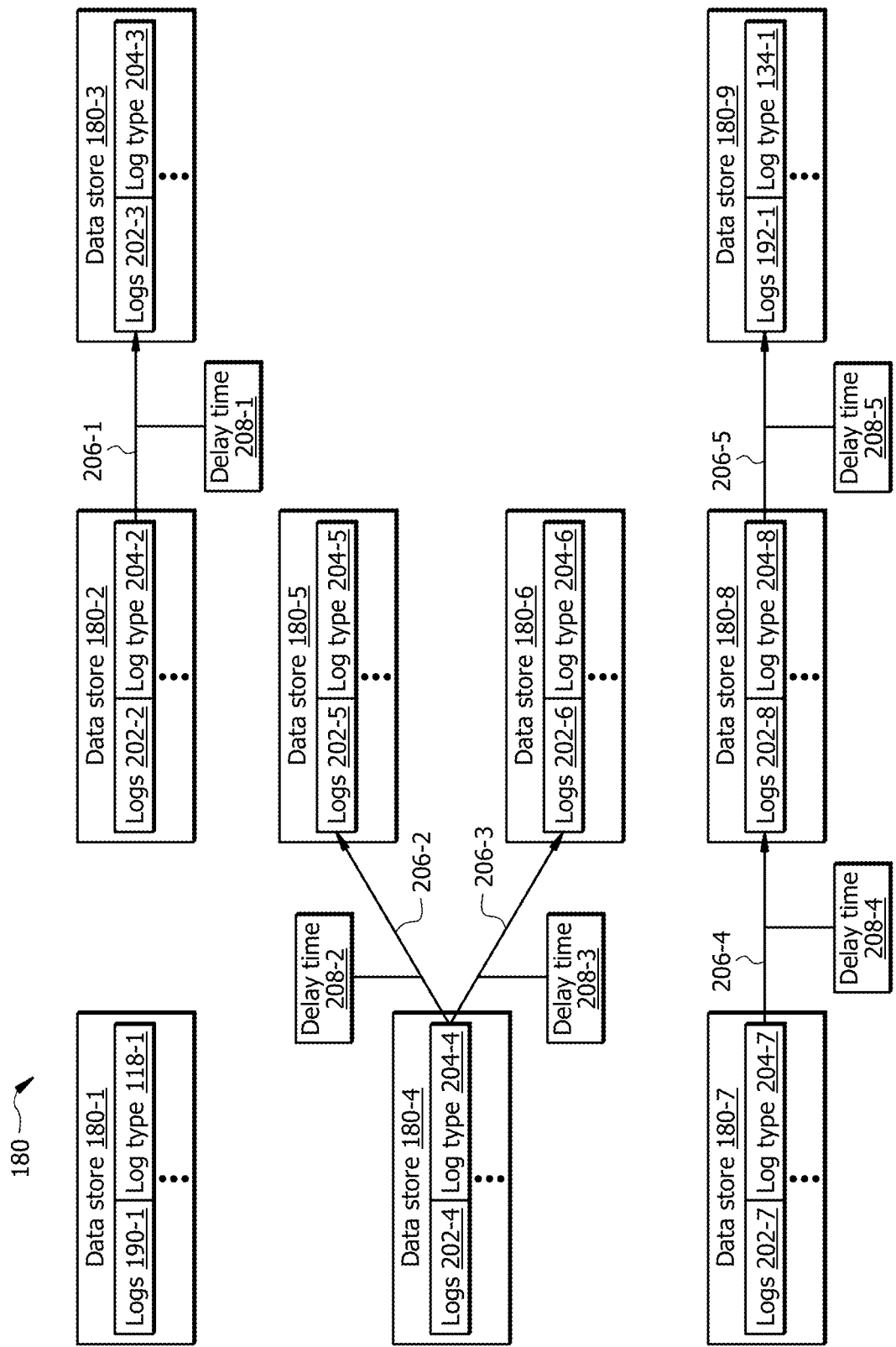
FIG. 2 illustrates an embodiment of a plurality of data stores.

Each of the data stores 180-1 through 180-*m* may be configured to generate logs of various log types. For example, the data store 180-1 generates logs 190-1 through 190-*n* of log types 118-1 through 118-*n*, respectively, and the data store 180-*m* generates logs 192-1 through 192-*k* of log types 134-1 through 134-*k*, respectively. The data stores 180-1 through 180-*m* may be operably coupled to each other over the network 102 using a plurality of pipelines and may exchange various data items, such as logs, for example. FIG. 2 illustrates an embodiment of the plurality of data stores 180 (including data stores 180-1 through 180-9). In the illustrated embodiment, the plurality of data stores 180 comprises 9 data stores 180-1 through 180-9. In other embodiments, the plurality of data stores 180 may comprise more or less than 9 data stores. The data store 180-1 is configured to generate logs 190-1 of the log type 118-1. The data store 180-*m* is configured to generate logs 192-1 of the log type 134-1. The data stores 180-2 through 180-8 are configured to generate logs 202-2 through 202-8 of log types 204-2 through 204-8, respectively.

In the illustrated embodiment, the data store 180-1 is not operably coupled to the data stores 180-2 through 180-9. The data store 180-2 is operably coupled to the data store 180-3 via a pipeline 206-1. The data store 180-3 is not operably coupled to the data stores 180-1, 180-4 through 180-9. The data store 180-4 is operably coupled to the data stores 180-5 and 180-6 via pipelines 206-2 and 206-3, respectively. The data store 180-5 is not operably coupled to the data stores 180-1 through 180-3, and 180-6 through 180-9. The data store 180-6 is not operably coupled to the data stores 180-1 through 180-3, 180-5, and 180-7 through 180-9. The data store 180-7 is operably coupled to the data store 180-8 via a pipeline 206-4. The data store 180-8 is operably coupled to the data store 180-9 via a pipeline 206-5. The data store 180-9 is not operably coupled to the data stores 180-1 through 180-7.

The pipeline 206-1 is configured to communicate logs 202-2 from the data store 180-2 to the data store 180-3. The data store 180-3 is configured to use logs 202-2 to generate logs 202-3. The pipeline 206-2 is configured to communicate logs 202-4 from the data store 180-4 to the data store 180-5. The data store 180-5 is configured to use logs 202-4 to generate logs 202-5. The pipeline 206-3 is configured to communicate logs 202-4 from the data store 180-4 to the data store 180-6. The data store 180-6 is configured to use logs 202-4 to generate logs 202-6. The pipeline 206-4 is configured to communicate logs 202-7 from the data store 180-7 to the data store 180-8. The data store 180-8 is configured to use logs 202-7 to generate logs 202-8. The pipeline 206-5 is configured to communicate logs 202-8 from the data store 180-8 to the data store 180-9. The data store 180-9 is configured to use logs 202-8 to generate logs 202-9.

Example Method for Automated Data Source Degradation Detection

Figure 3A:
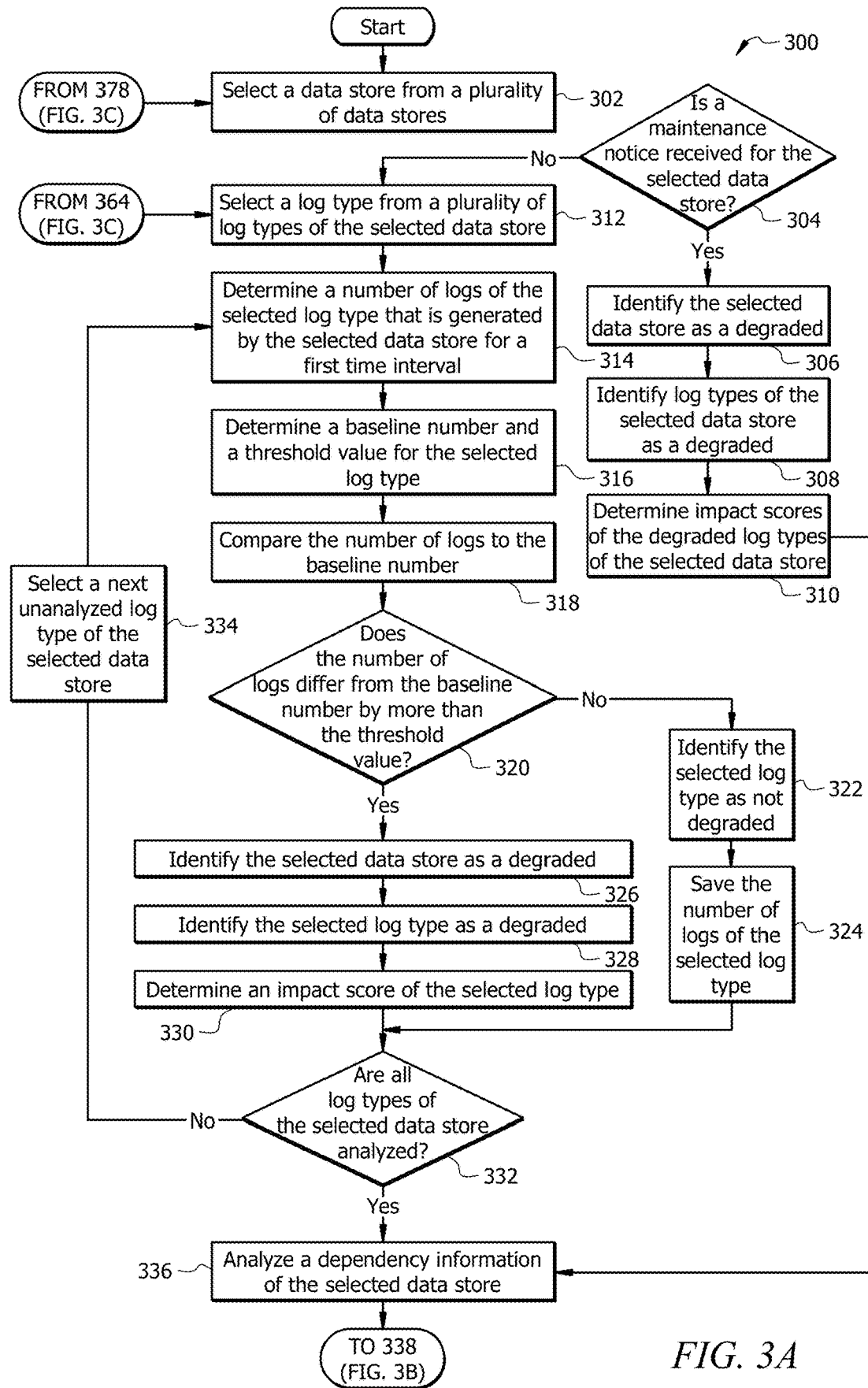
FIGS. 3A, 3B, and 3C illustrate an example method for automated data source degradation detection performed by the system of FIG. 1 for automated data source degradation detection.
Figure 3B:
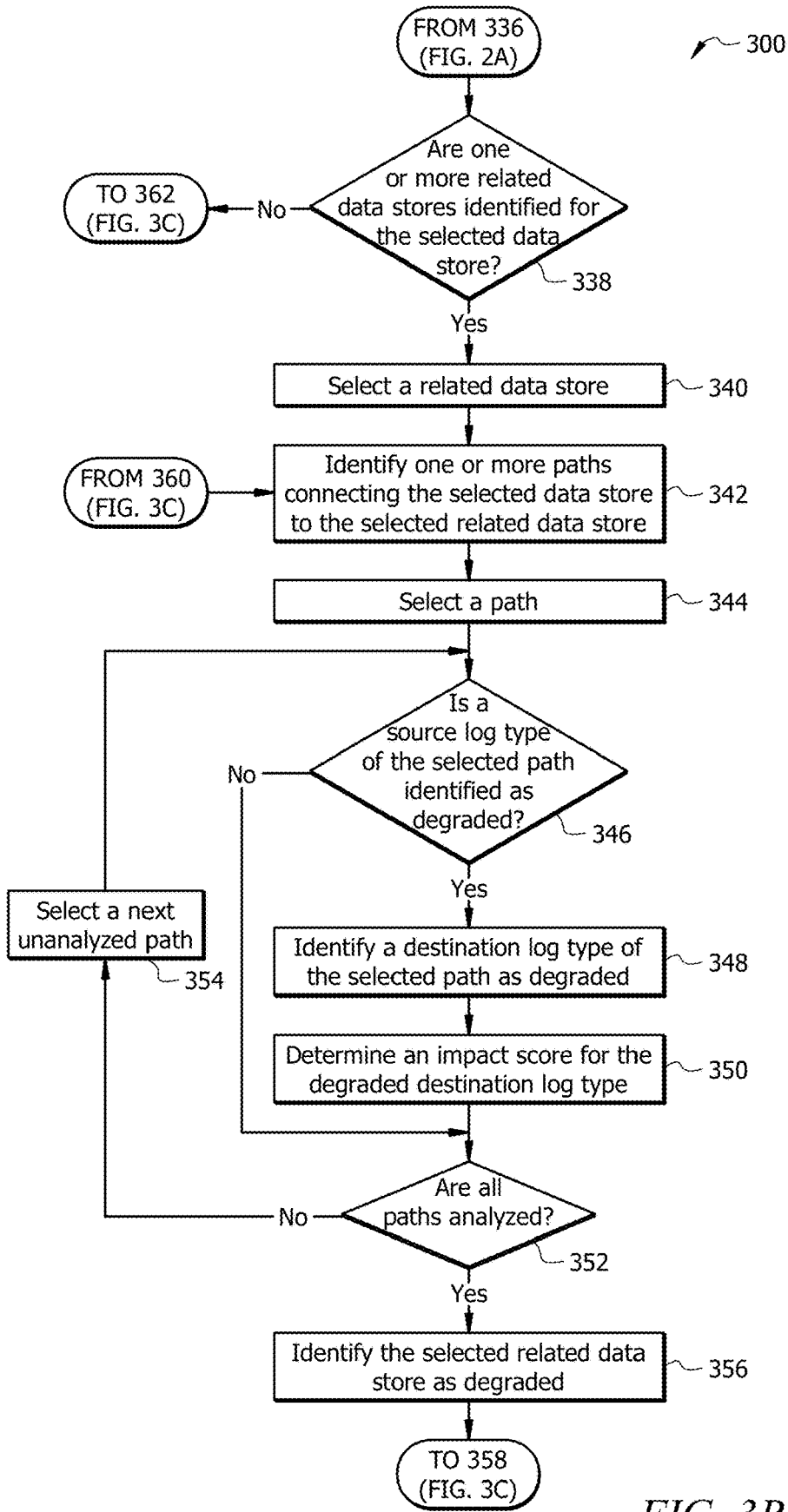
Figure 3C:
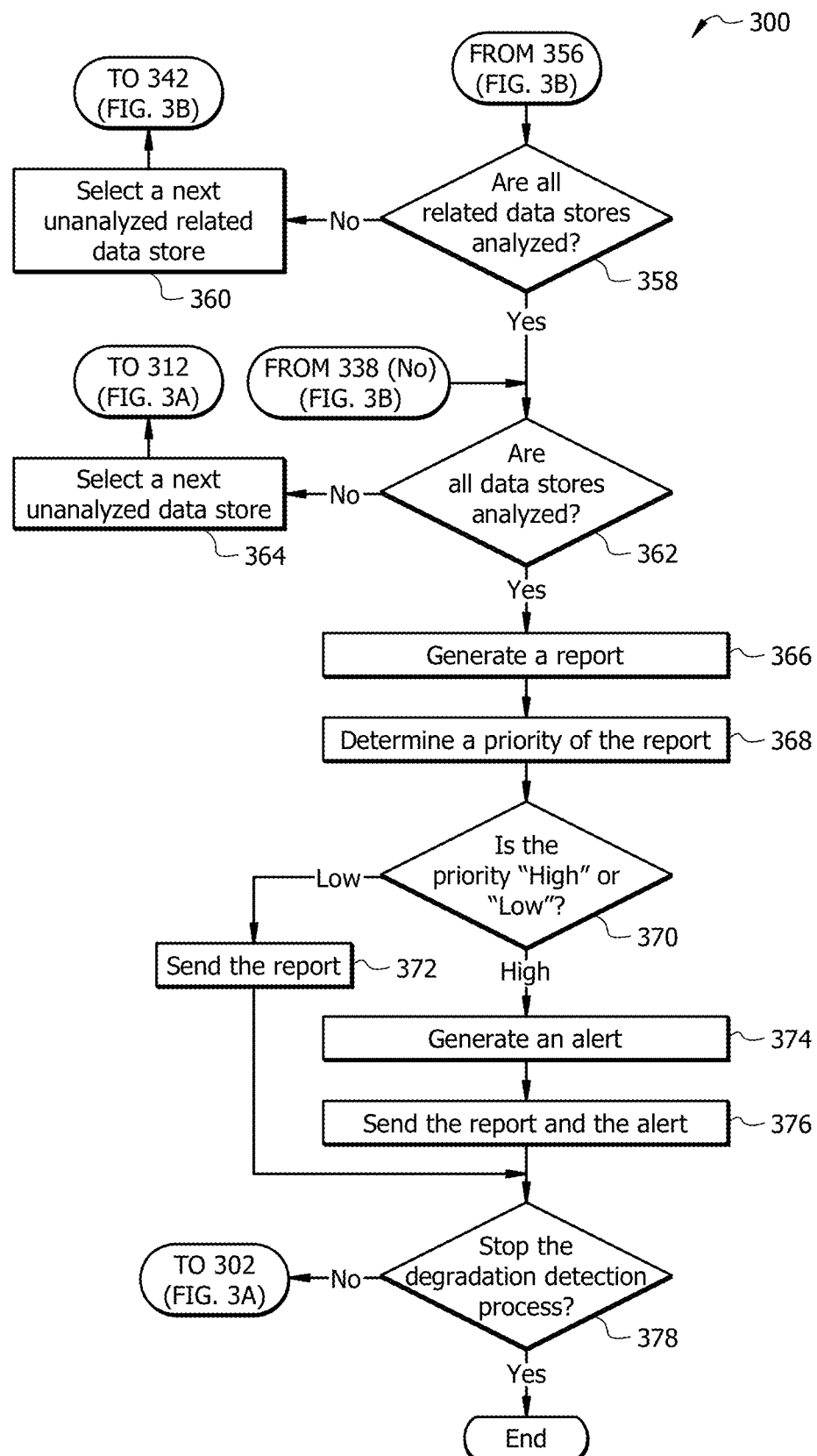

FIGS. 3A-3C illustrate an example flowchart of a method 300 for automated data source degradation detection. Modifications, additions, or omissions may be made to method 300. Method 300 may include more, fewer, or other operations. For example, operations may be performed in parallel or in any suitable order. For example, one or more operations of method 300 may be implemented, at least in part, in the form of software instructions (e.g., software instructions 112 and/or 188-1 through 188-*m* of FIG. 1), stored on non-transitory, tangible, computer-readable medium (e.g., memories 110 and/or 186-1 through 186-*m* of FIG. 1) that when executed by one or more processors (e.g., processors 106 and/or 182-1 through 182-m of FIG. 1) may cause the one or more processors to perform operations 302-378. Method 300 is described below with reference to FIGS. 1 and 2.

Method 300 starts with operation 302, where a processor 106 of the data monitoring system 104 selects a data store (e.g., respective one of data stores 180-1 through 180-m) from a plurality of data stores 180. In certain embodiments when the plurality of data stores 180 comprise data stores 180-1 through 180-9 (see FIG. 2), the selected data store may be the data stores 180-1, 180-2, 180-4, or 180-7. At operation 304, the processor 106 of the data monitoring system 104 determines whether a maintenance notice (e.g., respective one of notices 194) is received for the selected data store.

In response to determining at operation 304 that a maintenance notice (e.g., respective one of notices 194) is received for the selected data store, method 300 proceeds to operation 306. At operation 306, the processor 106 of the data monitoring system 104 identifies the selected data store as degraded. At operation 308, the processor 106 of the data monitoring system 104 identifies log types of the selected data store as degraded. In certain embodiments when the selected data store is the data store 180-1, the processor 106 of the data monitoring system 104 may identify the log type 118-1 as degraded. In certain embodiments when the selected data store is the data store 180-2, the processor 106 of the data monitoring system 104 may identify the log type 204-2 as degraded. In certain embodiments when the selected data store is the data store 180-4, the processor 106 of the data monitoring system 104 may identify the log type 204-4 as degraded. In certain embodiments when the selected data store is the data store 180-7, the processor 106 of the data monitoring system 104 may identify the log type 204-7 as degraded.

At operation 310, the processor 106 of the data monitoring system 104 determines impact scores of the degraded log types of the selected data store. In certain embodiments when the degraded log type of the selected data store is the log type 118-1 of the data store 180-1, the processor 106 of the data monitoring system 104 determines an impact score 120-1 associated with the log type 118-1 as the impact score of the degraded log type of the selected data store. After performing operation 310, method 300 proceeds to operation 336.

In response to determining at operation 304 that a maintenance notice (e.g., respective one of notices 194) is not received for the selected data store, method 300 proceeds to operation 312. At operation 312, the processor 106 of the data monitoring system 104 selects a log type from a plurality of log types of the selected data store. In certain embodiments when the selected data store is the data store 180-1, the processor 106 of the data monitoring system 104 may select the log type 118-1. In certain embodiments when the selected data store is the data store 180-2, the processor 106 of the data monitoring system 104 may select the log type 204-2. In certain embodiments when the selected data store is the data store 180-4, the processor 106 of the data monitoring system 104 may select the log type 204-4. In certain embodiments when the selected data store is the data store 180-7, the processor 106 of the data monitoring system 104 may select the log type 204-7.

At operation 314, the processor 106 of the data monitoring system 104 determines a number (e.g., number 166) of logs (e.g., logs 190-1, 202-2, 202-4, or 202-7) of the selected log type (e.g., log types 118-1, 204-2, 204-4, or 204-7) that is generated by the selected data store (e.g., data stores 180-1, 180-2, 180-4, or 180-7) at a first time (e.g., time 170) for a time interval (e.g., time interval 160). At operation 316, the processor 106 of the data monitoring system 104 determines a baseline number (e.g., baseline number 162A) and a threshold value (e.g., threshold 164A) for the selected log type (e.g., log types 118-1, 204-2, 204-4, or 204-7). In certain embodiments, the processor 106 of the data monitoring system 104 determines the baseline number (e.g., baseline number 162A) and the threshold value (e.g., threshold 164A) for the selected log type (e.g., log type 118-1) based on a plurality of numbers (e.g., plurality of numbers 152-1) for the selected log type (e.g., log type 118-1) that are stored in a memory 110 of the data monitoring system 104. In certain embodiments, the plurality of numbers (e.g., plurality of numbers 152-1) for the selected log type (e.g., log type 118-1) are stored in a data store profile (e.g., data store profile 116-1) for the selected data system (e.g., data store 180-1), which is stored in the database 114. The baseline number (e.g., baseline number 162A) is an expected number of logs (e.g., logs 190-1) of the selected log type (e.g., log type 118-1) to be generated by the selected data store (e.g., data store 180-1) at the first time (e.g., time 170) for the time interval (e.g., time interval 160).

At operation 318, the processor 106 of the data monitoring system 104 compares the number (e.g., number 166) of logs (e.g., logs 190-1) of the selected log type (e.g., log type 118-1) to the baseline number (e.g., baseline number 162A). At operation 320, the processor 106 of the data monitoring system 104 determines whether the number (e.g., number 166) of logs (e.g., logs 190-1) of the selected log type (e.g., log type 118-1) differs from the baseline number (e.g., baseline number 162A) by more than the threshold value (e.g., threshold 164A).

In response to determining at operation 320 that the number (e.g., number 166) of logs (e.g., logs 190-1) of the selected log type (e.g., log type 118-1) does not differ from the baseline number (e.g., baseline number 162A) by more than the threshold value (e.g., threshold 164A), method 300 proceeds to operation 322. At operation 322, the processor 106 of the data monitoring system 104 identifies the selected log type (e.g., log type 118-1) as not degraded. At operation 324, the processor 106 of the data monitoring system 104 saves the number (e.g., number 166) of logs (e.g., logs 190-1) of the selected log type (e.g., log type 118-1) in the data store profile (e.g., data store profile 116-1) of the selected data store (e.g., data store 180-1). After performing operation 324, method 300 proceeds to operation 332.

In response to determining at operation 320 that the number (e.g., number 166) of logs (e.g., logs 190-1) of the selected log type (e.g., log type 118-1) differs from the baseline number (e.g., baseline number 162A) by more than the threshold value (e.g., threshold 164A), method 300 proceeds to operation 326. At operation 326, the processor 106 of the data monitoring system 104 identifies the selected data store (e.g., data store 180-1) as a degraded. At operation 328, the processor 106 of the data monitoring system 104 identifies the selected log type (e.g., log type 118-1) as a degraded. At operation 330, the processor 106 of the data monitoring system 104 determines an impact score (e.g., impact score 120-1) of the selected log type (e.g., log type 118-1). In certain embodiments, the processor 106 of the data monitoring system 104 may determine the impact score (e.g., impact score 120-1) of the selected log type (e.g., log type 118-1) from the data store profile (e.g., data store profile 116-1) of the selected data store (e.g., data store 180-1). After performing operations 324 or 330, method 300 proceeds to operation 332. At operation 332, the processor 106 of the data monitoring system 104 determines whether all log types (e.g., log types 118-1 through 118-*n*) of the selected data store (e.g., data store 180-1) are analyzed.

In response to determining at operation 332 that all log types (e.g., log types 118-1 through 118-*n*) of the selected data store (e.g., data store 180-1) are not analyzed, method 300 proceeds to operation 334. At operation 334, the processor 106 of the data monitoring system 104 select a next unanalyzed log type (e.g., respective one of log types 118-1 through 118-*n*) of the selected data store (e.g., data store 180-1). After performing operation 334, method 300 proceeds to operation 314. In certain embodiments, operations 314 through 334 are performed one or more times until all log types (e.g., log types 118-1 through 118-*n*) of the selected data store (e.g., data store 180-1) are analyzed.

In response to determining at operation 332 that all log types (e.g., log types 118-1 through 118-*n*) of the selected data store (e.g., data store 180-1) are analyzed, method 300 proceeds to operation 336. At operation 336, the processor 106 of the data monitoring system 104 analyzes a dependency information (e.g., dependency information 124-1) of the selected data store (e.g., data store 180-1). In certain embodiments, the dependency information (e.g., dependency information 124-1) of the selected data store (e.g., data store 180-1) is stored in the data store profile (e.g., data store profile 116-1) of the selected data store (e.g., data store 180-1). At operation 338, the processor 106 of the data monitoring system 104 determines whether one or more related data stores are identified for the selected data store. In certain embodiments when the selected data store is the data store 180-1, the processor 106 of the data monitoring system 104 determines that no related data stores are identified for the selected data store. In certain embodiments when the selected data store is the data store 180-2, the processor 106 of the data monitoring system 104 identifies the data store 180-3 as a related data store for the selected data store. In certain embodiments when the selected data store is the data store 180-4, the processor 106 of the data monitoring system 104 identifies the data stores 180-5 and 180-6 as related data stores for the selected data store. In certain embodiments when the selected data store is the data store 180-7, the processor 106 of the data monitoring system 104 identifies the data stores 180-8 and 180-9 as related data stores for the selected data store.

In response to determining at operation 338 that no related data stores are identified for the selected data store (e.g., data store 180-1), method 300 proceeds to operation 362. In response to determining at operation 338 that the one or more related data stores (e.g., data stores 180-5 and 180-6 or data stores 180-8 and 180-9) are identified for the selected data store (e.g., data store 180-4 or data store 180-7), method 300 proceeds to operation 340. At operation 340, the processor 106 of the data monitoring system 104 selects a related data store from the one or more related data stores (e.g., data stores 180-5 and 180-6 or data stores 180-8 and 180-9).

At operation 342, the processor 106 of the data monitoring system 104 identifies one or more paths connecting the selected data store to the selected related data store. In certain embodiments when the selected data store is the data store 180-2 and the selected related data store is the data store 180-3, the processor 106 of the data monitoring system 104 identifies the pipeline 206-1 as a path connecting the selected data store to the selected related data store. In certain embodiments when the selected data store is the data store 180-4 and the selected related data store is the data store 180-5, the processor 106 of the data monitoring system 104 identifies the pipeline 206-2 as a path connecting the selected data store to the selected related data store. In certain embodiments when the selected data store is the data store 180-4 and the selected related data store is the data store 180-6, the processor 106 of the data monitoring system 104 identifies the pipeline 206-3 as a path connecting the selected data store to the selected related data store. In certain embodiments when the selected data store is the data store 180-7 and the selected related data store is the data store 180-8, the processor 106 of the data monitoring system 104 identifies the pipeline 206-4 as a path connecting the selected data store to the selected related data store. In certain embodiments when the selected data store is the data store 180-7 and the selected related data store is the data store 180-9, the processor 106 of the data monitoring system 104 identifies the pipelines 206-4 and 206-5 as a path connecting the selected data store to the selected related data store.

At operation 344, the processor 106 of the data monitoring system 104 selects a path of the one or more paths. At operation 346, the processor 106 of the data monitoring system 104 determines whether a source log type of the selected path is identified as degraded. In certain embodiments when the selected path comprises the pipeline 206-1, the processor 106 of the data monitoring system 104 determines whether a source log type 204-2 is identified as degraded. In certain embodiments when the selected path comprises the pipelines 206-2 or 206-3, the processor 106 of the data monitoring system 104 determines whether a source log type 204-4 is identified as degraded. In certain embodiments when the selected path comprises the pipeline 206-4 or pipelines 206-4 and 206-5, the processor 106 of the data monitoring system 104 determines whether a source log type 204-7 is identified as degraded.

In response to determining at operation 346 that the source log type of the selected path is identified as degraded, method 300 proceeds to operation 348. At operation 348, the processor 106 of the data monitoring system 104 identifies a destination log type of the selected path as degraded. In certain embodiments when the selected path comprises the pipeline 206-1, the processor 106 of the data monitoring system 104 identifies a destination log type 204-3 as degraded. In certain embodiments when the selected path comprises the pipelines 206-2, the processor 106 of the data monitoring system 104 identifies a destination log type 204-5 as degraded. In certain embodiments when the selected path comprises the pipelines 206-3, the processor 106 of the data monitoring system 104 identifies a destination log type 204-6 as degraded. In certain embodiments when the selected path comprises the pipeline 206-4, the processor 106 of the data monitoring system 104 identifies a destination log type 204-8 as degraded. In certain embodiments when the selected path comprises the pipelines 206-4 and 206-5, the processor 106 of the data monitoring system 104 identifies a destination log type 134-1 as degraded. At operation 350, the processor 106 of the data monitoring system 104 determines an impact score for the degraded destination log type. For example, when the degraded destination log type comprises the log type 134-1, the processor 106 of the data monitoring system 104 determines the impact score 136-1 as an impact score for the degraded destination log type.

In response to determining at operation 346 that the source log type of the selected path is identified as not degraded or after performing operation 350, method 300 proceeds to operation 352. At operation 352, the processor 106 of the data monitoring system 104 determines whether are all paths are analyzed. In response to determining at operation 352 that all paths are not analyzed, method 300 proceeds to operation 354. At operation 354, the processor 106 of the data monitoring system 104 selects a next unanalyzed path of the one or more paths. After operation 354, method 300 proceeds to operation 346. In certain embodiments, operations 346 through 354 may be repeated one or more times until all paths are analyzed.

In response to determining at operation 352 that all paths are analyzed, method 300 proceeds to operation 356. At operation 356, the processor 106 of the data monitoring system 104 identifies the selected related data store as degraded. In certain embodiments when the selected data store comprises the data store 180-2, the processor 106 of the data monitoring system 104 identifies the selected related data store 180-3 as degraded. In certain embodiments when the selected data store comprises the data store 180-4, the processor 106 of the data monitoring system 104 identifies the selected related data stores 180-5 or 180-6 as degraded. In certain embodiments when the selected data store comprises the data store 180-7, the processor 106 of the data monitoring system 104 identifies the selected related data stores 180-8 or 180-9 as degraded.

At operation 358, the processor 106 of the data monitoring system 104 determines whether all related data stores are analyzed. In response to determining at operation 358 that all related data stores are not analyzed, 300 proceeds to operation 360. At operation 360, the processor 106 of the data monitoring system 104 select a next unanalyzed related data store from the one or more related data stores. After performing operation 360, method 300 proceeds to operation 342. In certain embodiments, operation 342 through 360 may be performed one or more times until all related data stores are analyzed. In response to determining at operation 358 that all related data stores are analyzed, 300 proceeds to operation 362. At operation 362, the processor 106 of the data monitoring system 104 determines whether all data stores (e.g., data stores 180) are analyzed.

In response to determining at operation 362 that all data stores are not analyzed, method 300 proceeds to operation 364. At operation 364, the processor 106 of the data monitoring system 104 selects a next unanalyzed data store. In certain embodiments when the selected data store comprises the data store 180-1, the processor 106 of the data monitoring system 104 may select the data stores 180-2, 180-4, or 180-7 as the next unanalyzed data store. In certain embodiments when the selected data store comprises the data store 180-2, the processor 106 of the data monitoring system 104 may select the data stores 180-1, 180-4, or 180-7 as the next unanalyzed data store. In certain embodiments when the selected data store comprises the data store 180-4, the processor 106 of the data monitoring system 104 may select the data stores 180-1, 180-2, or 180-7 as the next unanalyzed data store. In certain embodiments when the selected data store comprises the data store 180-7, the processor 106 of the data monitoring system 104 may select the data stores 180-1, 180-2, or 180-4 as the next unanalyzed data store. After performing operation 364, method 300 proceeds to operation 312. In certain embodiments, operations 312 through 364 may be repeated one or more times until all data stores are analyzed.

In response to determining at operation 362 that all data stores are analyzed, method 300 proceeds to operation 366. At operation 366, the processor 106 of the data monitoring system 104 generates a report (e.g., report 174). In certain embodiments, the report (e.g., report 174) comprises identifications of degraded data stores, identifications of degraded log types for each degraded data stores, and impact scores of the degraded log types. In certain embodiments when a maintenance notice is received for a data store, the report (e.g., report 174) further comprises an identification that the data store is degraded due to maintenance. In certain embodiments, the report (e.g., report 174) is updated as the data stores are analyzed.

At operation 368, the processor 106 of the data monitoring system 104 determines a priority (e.g., priority 176) of the report (e.g., report 174). In certain embodiments, the processor 106 of the data monitoring system 104 determines the priority (e.g., priority 176) of the report (e.g., report 174) based at least in part on the impact scores of the degraded log types. At operation 370, the processor 106 of the data monitoring system 104 determines whether the priority (e.g., priority 176) is "High" or "Low."

In response to determining at operation 370 that the priority (e.g., priority 176) is "Low," method 300 proceeds to operation 372. At operation 372, the processor 106 of the data monitoring system 104 sends the report (e.g., report 174) to a data store maintenance team. After performing operation 372, method 300 proceeds to operation 378. In response to determining at operation 370 that the priority (e.g., priority 176) is "High," method 300 proceeds to operation 374. At operation 364, the processor 106 of the data monitoring system 104 generates an alert (e.g., alert 178) that the report (e.g., report 174) needs an immediate response. At operation 376, the processor 106 of the data monitoring system 104 sends the report (e.g., report 174) and the alert (e.g., alert 178) to the data store maintenance team.

After performing operations 372 or 376, method 300 proceeds to operation 378. At operation 378, the processor 106 of the data monitoring system 104 determines whether to stop the degradation detection process. In certain embodiments, the processor 106 of the data monitoring system 104 may determine to stop the degradation detection process in response to receiving an instruction (e.g., instruction 196) to stop the degradation detection process. In response to determining at operation 378 that the instruction (e.g., instruction 196) to stop the degradation detection process is not received, method 300 proceeds to operation 302. In certain embodiments, operations 302 through 378 may be repeated one or more times until the instruction (e.g., instruction 196) to stop the degradation detection process is received. In response to determining at operation 378 that the instruction (e.g., instruction 196) to stop the degradation detection process is received, method 300 ends.

Example Method for Automated Data Pipeline Degradation Detection

Figure 4A:
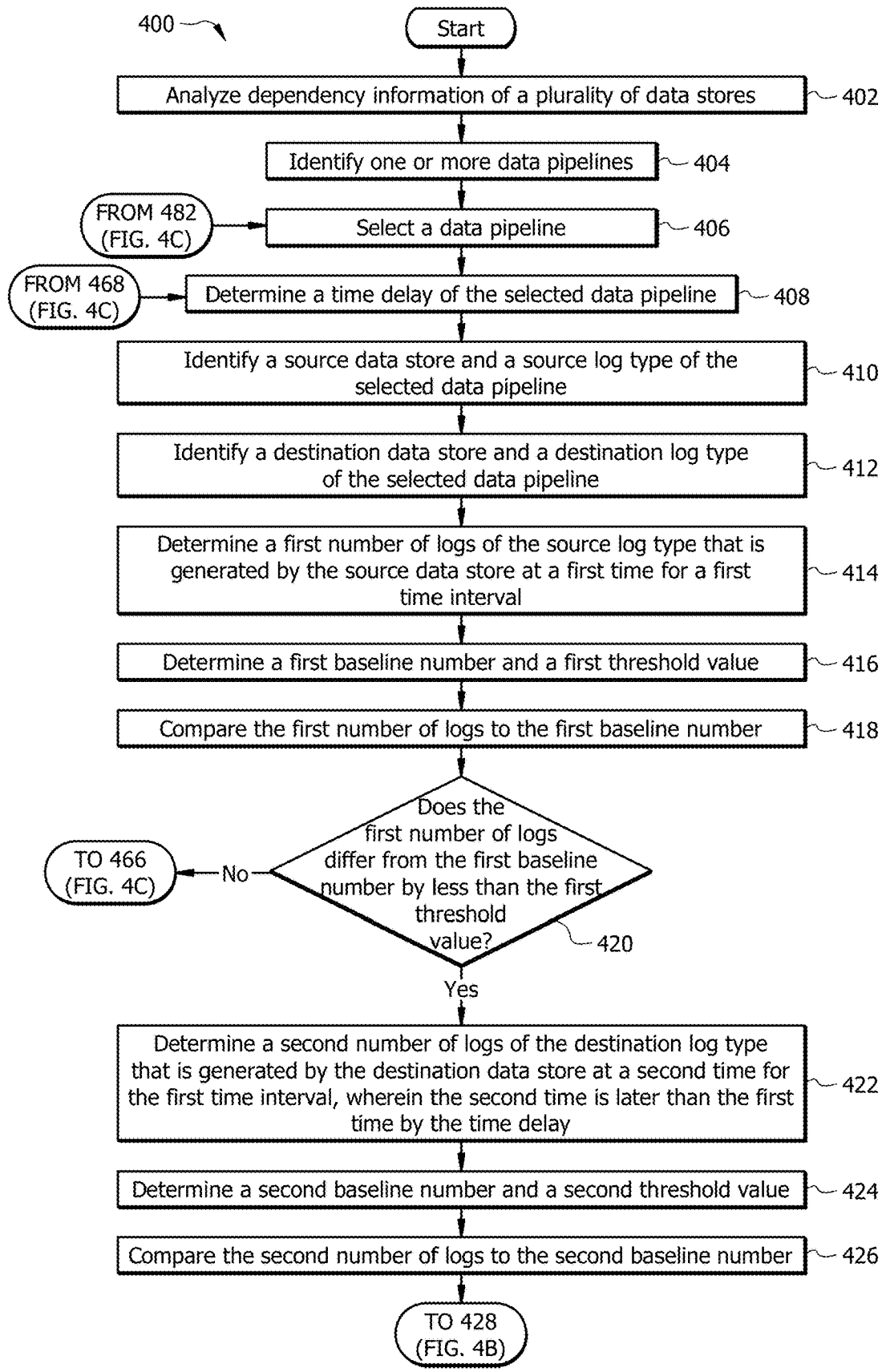
FIGS. 4A, 4B, and 4C illustrate an example method for automated data pipeline degradation detection performed by the system of FIG. 1 for automated data source degradation detection.
Figure 4B:
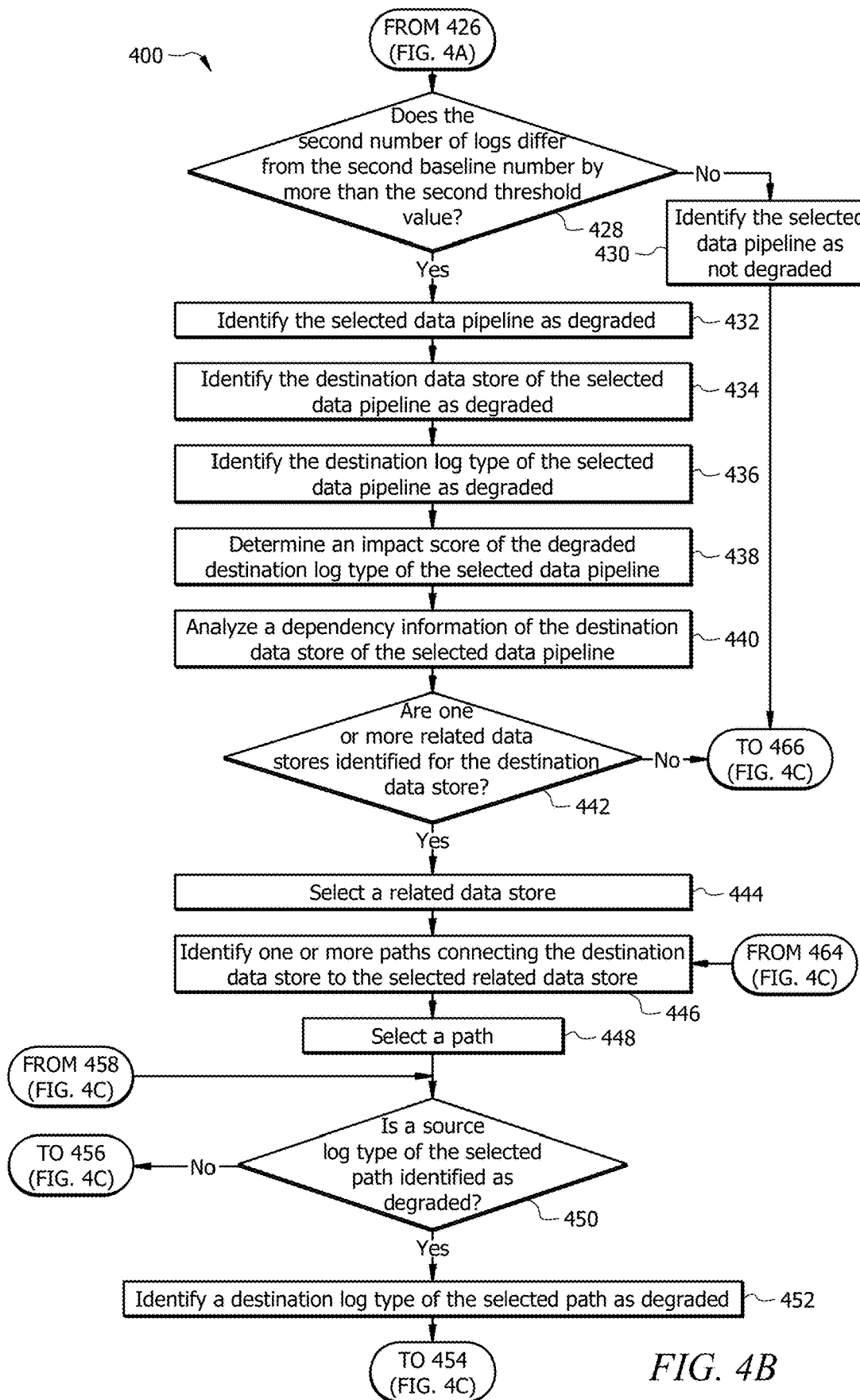
Figure 4C:
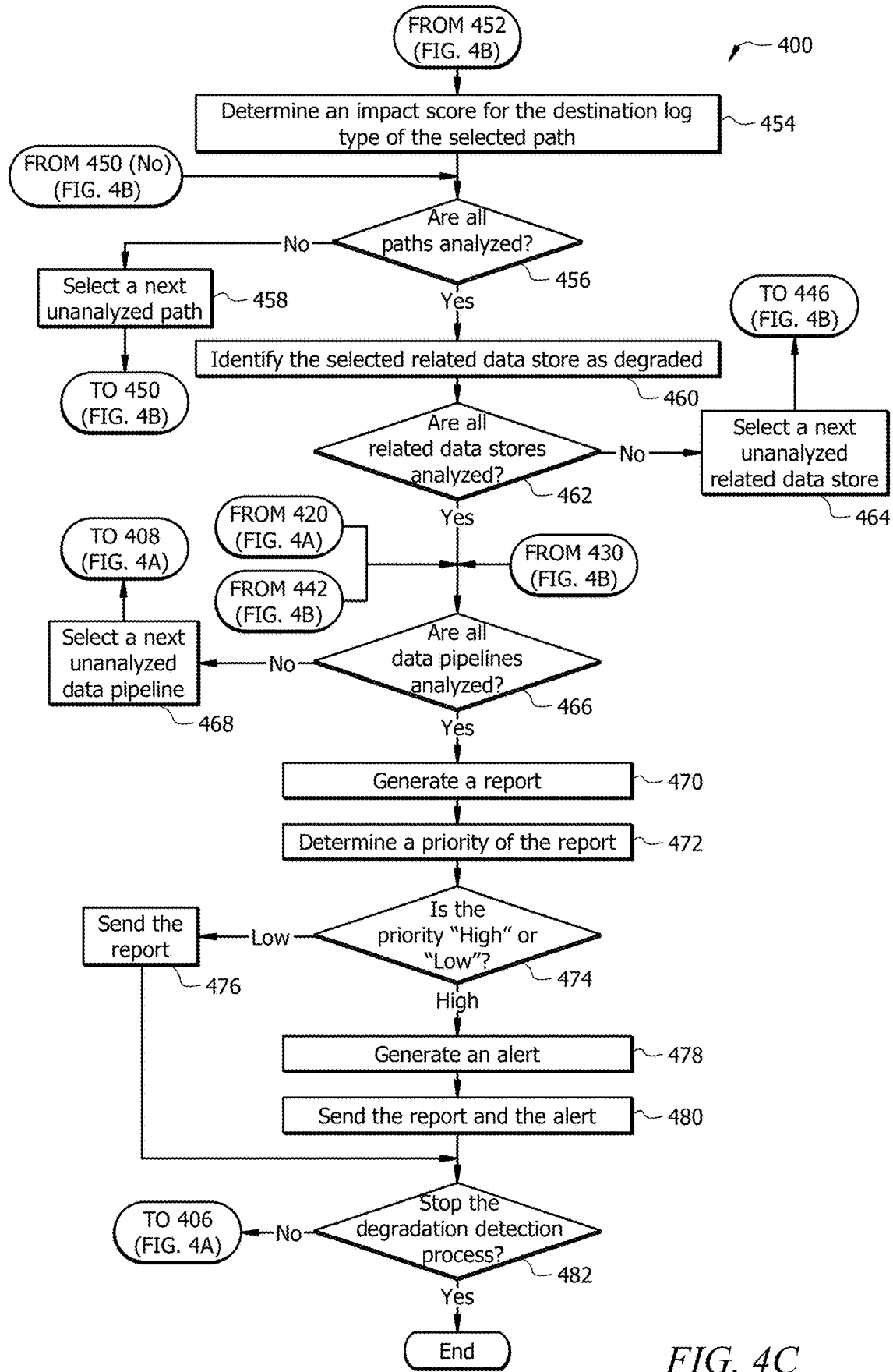

FIGS. 4A-4C illustrate an example flowchart of a method 400 for automated data pipeline degradation detection. Modifications, additions, or omissions may be made to method 400. Method 400 may include more, fewer, or other operations. For example, operations may be performed in parallel or in any suitable order. For example, one or more operations of method 400 may be implemented, at least in part, in the form of software instructions (e.g., software instructions 112 and/or 188-1 through 188-m of FIG. 1), stored on non-transitory, tangible, computer-readable medium (e.g., memories 110 and/or 186-1 through 186-m of FIG. 1) that when executed by one or more processors (e.g., processors 106 and/or 182-1 through 182-m of FIG. 1) may cause the one or more processors to perform operations 402-482. Method 400 is described below with reference to FIGS. 1 and 2.

Method 400 starts with operation 402, where the processor 106 of the data monitoring system 104 analyzes dependency information (e.g., dependency information 124-1 through 124-*m*) of a plurality of data stores 180 (e.g., data stores 180-1 through 180-*m*). At operation 404, the processor 106 of the data monitoring system 104 identifies one or more data pipelines based on the dependency information (e.g., dependency information 124-1 through 124-*m*). In certain embodiments, when the plurality of data stores 180 comprises the data stores 180-1 through 180-9 (see FIG. 2), one or more data pipelines may comprise data pipelines 206-1 through 206-5.

At operation 406, the processor 106 of the data monitoring system 104 selects a data pipeline. In certain embodiments, the data pipeline may be any of the data pipelines 206-1 through 206-4. At operation 408, the processor 106 of the data monitoring system 104 determines a time delay of the selected data pipeline. In certain embodiments when the data pipeline is the data pipeline 206-1, the data pipeline 206-2, the data pipeline 206-3, or the data pipeline 206-4, the time delay is a time delay 208-1, a time delay 208-2, a time delay 208-3, or a time delay 208-4, respectively.

At operation 410, the processor 106 of the data monitoring system 104 identifies a source data store and a source log type of the selected data pipeline. In certain embodiments when the selected data pipeline is the data pipeline 206-1, the processor 106 of the data monitoring system 104 identifies the data store 180-2 as the source data store and the log type 204-2 as the source log type. In certain embodiments when the selected data pipeline is the data pipeline 206-2, the processor 106 of the data monitoring system 104 identifies the data store 180-4 as the source data store and the log type 204-4 as the source log type. In certain embodiments when the selected data pipeline is the data pipeline 206-3, the processor 106 of the data monitoring system 104 identifies the data store 180-4 as the source data store and the log type 204-4 as the source log type. In certain embodiments when the selected data pipeline is the data pipeline 206-4, the processor 106 of the data monitoring system 104 identifies the data store 180-7 as the source data store and the log type 204-7 as the source log type.

At operation 412, the processor 106 of the data monitoring system 104 identifies a destination data store and a destination log type of the selected data pipeline. In certain embodiments when the selected data pipeline is the data pipeline 206-1, the processor 106 of the data monitoring system 104 identifies the data store 180-3 as the destination data store and the log type 204-3 as the destination log type. In certain embodiments when the selected data pipeline is the data pipeline 206-2, the processor 106 of the data monitoring system 104 identifies the data store 180-5 as the destination data store and the log type 204-5 as the destination log type. In certain embodiments when the selected data pipeline is the data pipeline 206-3, the processor 106 of the data monitoring system 104 identifies the data store 180-6 as the destination data store and the log type 204-6 as the destination log type. In certain embodiments when the selected data pipeline is the data pipeline 206-4, the processor 106 of the data monitoring system 104 identifies the data store 180-8 as the destination data store and the log type 204-8 as the destination log type.

At operation 414, the processor 106 of the data monitoring system 104 determines a first number of logs (e.g., number 166) of the source log type that is generated by the source data store at a first time (e.g., time 170) for a time interval (e.g., time interval 160). At operation 416, the processor 106 of the data monitoring system 104 determines a first baseline number (e.g., baseline number 162A) and a first threshold value (e.g., threshold 164A) for the source log type. In certain embodiments, the processor 106 of the data monitoring system 104 determines the first baseline number (e.g., baseline number 162A) and the first threshold value (e.g., threshold 164A) for the source log type based on a plurality of numbers for the source log type (e.g., log types 204-2, 204-4, or 204-7) that is stored in a memory 110 of the data monitoring system 104. In certain embodiments, the plurality of numbers for the source log type (e.g., log types 204-2, 204-4, or 204-7) is stored in a data store profile (e.g., respective one of data store profiles 150-1 through 150-*m*) for the source data store (e.g., data stores 180-2, 180-4, or 180-7), which is stored in the database 148. In certain embodiments, the first baseline number (e.g., baseline number 162A) is an expected number of logs (e.g., logs 202-2, 202-4, or 202-7) of the source log type (e.g., log types 204-2, 204-4, or 204-7) to be generated by the source data store (e.g., data stores 180-2, 180-4, or 180-7) at the first time (e.g., time 170) for the time interval (e.g., time interval 160).

At operation 418, the processor 106 of the data monitoring system 104 compares the first number of logs (e.g., number 166) of the source log type (e.g., log types 204-2, 204-4, or 204-7) to the first baseline number (e.g., baseline number 162A). At operation 420, the processor 106 of the data monitoring system 104 determines whether the first number of logs (e.g., number 166) of the source log type (e.g., log types 204-2, 204-4, or 204-7) differs from the first baseline number (e.g., baseline number 162A) by less than the first threshold value (e.g., threshold 164A).

In response to determining at operation 420 that the first number of logs (e.g., number 166) of the source log type (e.g., log types 204-2, 204-4, or 204-7) does not differ from the first baseline number (e.g., baseline number 162A) by less than the first threshold value (e.g., threshold 164A), method 300 proceeds to operation 466. In response to determining at operation 420 that the first number of logs (e.g., number 166) of the source log type (e.g., log types 204-2, 204-4, or 204-7) differs from the first baseline number (e.g., baseline number 162A) by less than the first threshold value (e.g., threshold 164A), method 400 proceeds to operation 422.

At operation 422, the processor 106 of the data monitoring system 104 determines a second number of logs (e.g., number 168) of the destination log type (e.g., log types 204-3, 204-5, 204-6, or 204-8) that is generated by the destination data store (e.g., data stores 180-3, 180-5, 180-6, or 180-8) at a second time (e.g., time 172) for the time interval (e.g., time interval 160). In certain embodiments, the second time (e.g., time 172) is later than the first time (e.g., time 170) by the time delay (e.g., time delays 208-1, 208-2, 208-3, or 208-4).

At operation 424, the processor 106 of the data monitoring system 104 determines a second baseline number (e.g., baseline number 162B) and a second threshold value (e.g., threshold 164B) for the destination log type (e.g., log types 204-3, 204-5, 204-6, or 204-8). In certain embodiments, the processor 106 of the data monitoring system 104 determines the second baseline number (e.g., baseline number 162B) and the second threshold value (e.g., threshold 164B) for the destination log type (e.g., log types 204-3, 204-5, 204-6, or 204-8) based on a plurality of numbers for the destination log type (e.g., log types 204-3, 204-5, 204-6, or 204-8) that is stored in the memory 110 of the data monitoring system 104. In certain embodiments, the plurality of numbers for the destination log type (e.g., log types 204-3, 204-5, 204-6, or 204-8) is stored in a data store profile (e.g., respective one of data store profiles 150-1 through **150-*m*) for the destination data store (e.g., data stores 180-3, 180-5, 180-6, or 180-8), which is stored in the database 148. In certain embodiments, the second baseline number (e.g., baseline number 162B) is an expected number of logs (e.g., logs 202-3, 202-5, 202-6, or 202-8) of the destination log type (e.g., log types 204-3, 204-5, 205-6, or 204-8) to be generated by the destination data store (e.g., data stores 180-3, 180-5, 180-6, or 180-8) at the second time (e.g., time 172) for the time interval (e.g., time interval 160**).

At operation 426, the processor 106 of the data monitoring system 104 compares the second number of logs (e.g., number 168) of the destination log type (e.g., log types 204-3, 204-5, 205-6, or 204-8) to the second baseline number (e.g., baseline number 162B). At operation 428, the processor 106 of the data monitoring system 104 determines whether the second number of logs (e.g., number 168) of the destination log type (e.g., log types 204-3, 204-5, 205-6, or 204-8) differs from the second baseline number (e.g., baseline number 162B) by more than the second threshold value (e.g., threshold 164B).

In response to determining at operation 428 that the second number of logs (e.g., number 168) of the destination log type (e.g., log types 204-3, 204-5, 205-6, or 204-8) does not differ from the second baseline number (e.g., baseline number 162B) by more than the second threshold value (e.g., threshold 164B), method 400 proceeds to operation 430. At operation 430, the processor 106 of the data monitoring system 104 identifies the selected data pipeline (e.g., data pipelines 206-1, 206-2, 206-3, or 206-4) as not degraded. After performing operation 430, method 400 proceeds to operation 466.

In response to determining at operation 428 that the second number of logs (e.g., number 168) of the destination log type (e.g., log types 204-3, 204-5, 205-6, or 204-8) differs from the second baseline number (e.g., baseline number 162B) by more than the second threshold value (e.g., threshold 164B), method 400 proceeds to operation 432. At operation 432, the processor 106 of the data monitoring system 104 identifies the selected data pipeline (e.g., data pipelines 206-1, 206-2, 206-3, or 206-4) as degraded. At operation 434, the processor 106 of the data monitoring system 104 identifies the destination data store (e.g., data stores 180-3, 180-5, 180-6, or 180-8) of the selected data pipeline (e.g., data pipelines 206-1, 206-2, 206-3, or 206-4) as degraded. At operation 436, the processor 106 of the data monitoring system 104 identifies the destination log type (e.g., log types 204-3, 204-5, 205-6, or 204-8) of the selected data pipeline (e.g., data pipelines 206-1, 206-2, 206-3, or 206-4) as degraded.

At operation 438, the processor 106 of the data monitoring system 104 determines an impact score (e.g., respective one of impact scores 120-1 through **120-*n* and 136-1 through 136-*k*) of the degraded destination log type (e.g., log types 204-3, 204-5, 205-6, or 204-8) of the selected data pipeline (e.g., log types 204-3, 204-5, 205-6, or 204-8). At operation 440, the processor 106 of the data monitoring system 104 analyzes a dependency information (e.g., respective one of dependency information 124-1 through 124-*m*) of the destination data store (e.g., data stores 180-3, 180-5, 180-6, or 180-8) of the selected data pipeline (e.g., data pipelines 206-1, 206-2, 206-3, or 206-4). At operation 442, the processor 106 of the data monitoring system 104 determines whether one or more related data stores are identified for the destination data store (e.g., data stores 180-3, 180-5, 180-6, or 180-8). In certain embodiments when the destination data store is the data store 180-3, the data store 180-5, or the data store 180-6, the processor 106 of the data monitoring system 104 determines that no related data stores are identified for the destination data store. In certain embodiments when the destination data store is the data store 180-8, the processor 106 of the data monitoring system 104 identifies the data store 180-9** as the related data store for the destination data store.

In response to determining at operation 442 that no related data stores are identified for the destination data store (e.g., data stores 180-3, 180-5, or 180-6), method 400 proceeds to operation 466. In response to determining at operation 442 that the one or more related data stores (e.g., data store 180-9) are identified for the destination data store (e.g., data store 180-7), method 400 proceeds to operation 444. At operation 444, the processor 106 of the data monitoring system 104 selects a related data store (e.g., data store 180-9) from the one or more related data stores. At operation 446, the processor 106 of the data monitoring system 104 identifies one or more paths connecting the destination data store (e.g., data store 180-8) to the selected related data store (e.g., data store 180-9). In certain embodiments when the destination data store is the data store 180-8 and the selected related data store is the data store 180-9, the processor 106 of the data monitoring system 104 identifies the pipeline 206-5 as a path connecting the destination data store to the selected related data store.

At operation 448, the processor 106 of the data monitoring system 104 selects a path (e.g., pipeline 206-5) from the one or more paths. At operation 450, the processor 106 of the data monitoring system 104 determines whether a source log type (e.g., log type 204-8) of the selected path (e.g., pipeline 206-5) is identified as degraded. In response to determining at operation 450 that the source log type (e.g., log type 204-8) of the selected path (e.g., pipeline 206-5) is not identified as degraded, method 400 proceeds to operation 456. In response to determining at operation 450 that the source log type (e.g., log type 204-8) of the selected path (e.g., pipeline 206-5) is identified as degraded, method 400 proceeds to operation 452. At operation 452, the processor 106 of the data monitoring system 104 identifies a destination log type (e.g., log type 134-1) of the selected path (e.g., pipeline 206-5) as degraded. At operation 454, the processor 106 of the data monitoring system 104 determines an impact score (e.g., the impact score 136-1) for the destination log type (e.g., log type 134-1) of the selected path (e.g., pipeline 206-5).

In response to determining at operation 450 that the source log type (e.g., log type 204-8) of the selected path (e.g., pipeline 206-5) is not identified as degraded or after performing operation 454, method 400 proceeds to operation 456. At operation 456, the processor 106 of the data monitoring system 104 determines whether are all paths are analyzed. In response to determining at operation 456 that all paths are not analyzed, method 400 proceeds to operation 458. At operation 458, the processor 106 of the data monitoring system 104 selects a next unanalyzed path of the one or more paths. After operation 458, method 400 proceeds to operation 450. In certain embodiments, operations 450 through 458 may be repeated one or more times until all paths are analyzed.

In response to determining at operation 456 that all paths are analyzed, method 400 proceeds to operation 460. At operation 460, the processor 106 of the data monitoring system 104 identifies the selected related data store (e.g., data store 180-9) as degraded. At operation 462, the processor 106 of the data monitoring system 104 determines whether all related data stores are analyzed. In response to determining at operation 462 that all related data stores are not analyzed, 400 proceeds to operation 464. At operation 464, the processor 106 of the data monitoring system 104 selects a next unanalyzed related data store from the one or more related data stores. After performing operation 464, method 400 proceeds to operation 446. In certain embodiments, operation 446 through 464 may be performed one or more times until all related data stores are analyzed.

In response to determining at operation 462 that all related data stores are analyzed, 400 proceeds to operation 466. At operation 466, the processor 106 of the data monitoring system 104 determines whether all data pipelines are analyzed. In response to determining at operation 466 that all data pipelines are not analyzed, method 400 proceeds to operation 468. At operation 468, the processor 106 of the data monitoring system 104 selects a next unanalyzed data pipeline. In certain embodiments when the selected data pipeline is the pipeline 206-1, the processor 106 of the data monitoring system 104 may select the data pipelines 206-2, 206-3, or 206-4 as the next unanalyzed data pipeline. In certain embodiments when the selected data pipeline is the data pipeline 206-2, the processor 106 of the data monitoring system 104 may select the data pipelines 206-1, 206-3, or 206-4 as the next unanalyzed data pipeline. In certain embodiments when the selected data pipeline is the data pipeline 206-3, the processor 106 of the data monitoring system 104 may select the data pipelines 206-1, 206-2, or 206-4 as the next unanalyzed data pipeline. In certain embodiments when the selected data pipeline is the data pipeline 206-4, the processor 106 of the data monitoring system 104 may select the data pipelines 206-1, 206-2, or 206-3 as the next unanalyzed data pipeline.

In response to determining at operation 466 that all data pipelines are analyzed, method 400 proceeds to operation 470. At operation 470, the processor 106 of the data monitoring system 104 generates a report (e.g., report 174). In certain embodiments, the report (e.g., report 174) comprises identification of degraded data pipelines, identifications of degraded data stores, identifications of degraded log types for each degraded data stores, and impact scores of the degraded log types. In certain embodiments, the report (e.g., report 174) is updated as the data stores are analyzed.

At operation 472, the processor 106 of the data monitoring system 104 determines a priority (e.g., priority 176) of the report (e.g., report 174). In certain embodiments, the processor 106 of the data monitoring system 104 determines the priority (e.g., priority 176) of the report (e.g., report 174) based at least in part on the impact scores of the degraded log types. At operation 474, the processor 106 of the data monitoring system 104 determines whether the priority (e.g., priority 176) is "High" or "Low."

In response to determining at operation 474 that the priority (e.g., priority 176) is "Low," method 400 proceeds to operation 476. At operation 476, the processor 106 of the data monitoring system 104 sends the report (e.g., report 174) to a data store maintenance team. After performing operation 476, method 400 proceeds to operation 482. In response to determining at operation 474 that the priority (e.g., priority 176) is "High," method 400 proceeds to operation 478. At operation 478, the processor 106 of the data monitoring system 104 generates an alert (e.g., alert 178) that the report (e.g., report 174) needs an immediate response. At operation 480, the processor 106 of the data monitoring system 104 sends the report (e.g., report 174) and the alert (e.g., alert 178) to the data store maintenance team.

After performing operations 476 or 480, method 400 proceeds to operation 482. At operation 482, the processor 106 of the data monitoring system 104 determines whether to stop the degradation detection process. In certain embodiments, the processor 106 of the data monitoring system 104 may determine to stop the degradation detection process in response to receiving an instruction (e.g., instruction 196) to stop the degradation detection process. In response to determining at operation 482 that the instruction (e.g., instruction 196) to stop the degradation detection process is not received, method 400 proceeds to operation 406. In certain embodiments, operations 406 through 482 may be repeated one or more times until the instruction (e.g., instruction 196) to stop the degradation detection process is received. In response to determining at operation 482 that the instruction (e.g., instruction 196) to stop the degradation detection process is received, method 300 ends.

Example Method for Automated Data Item Degradation Detection

Figure 5A:
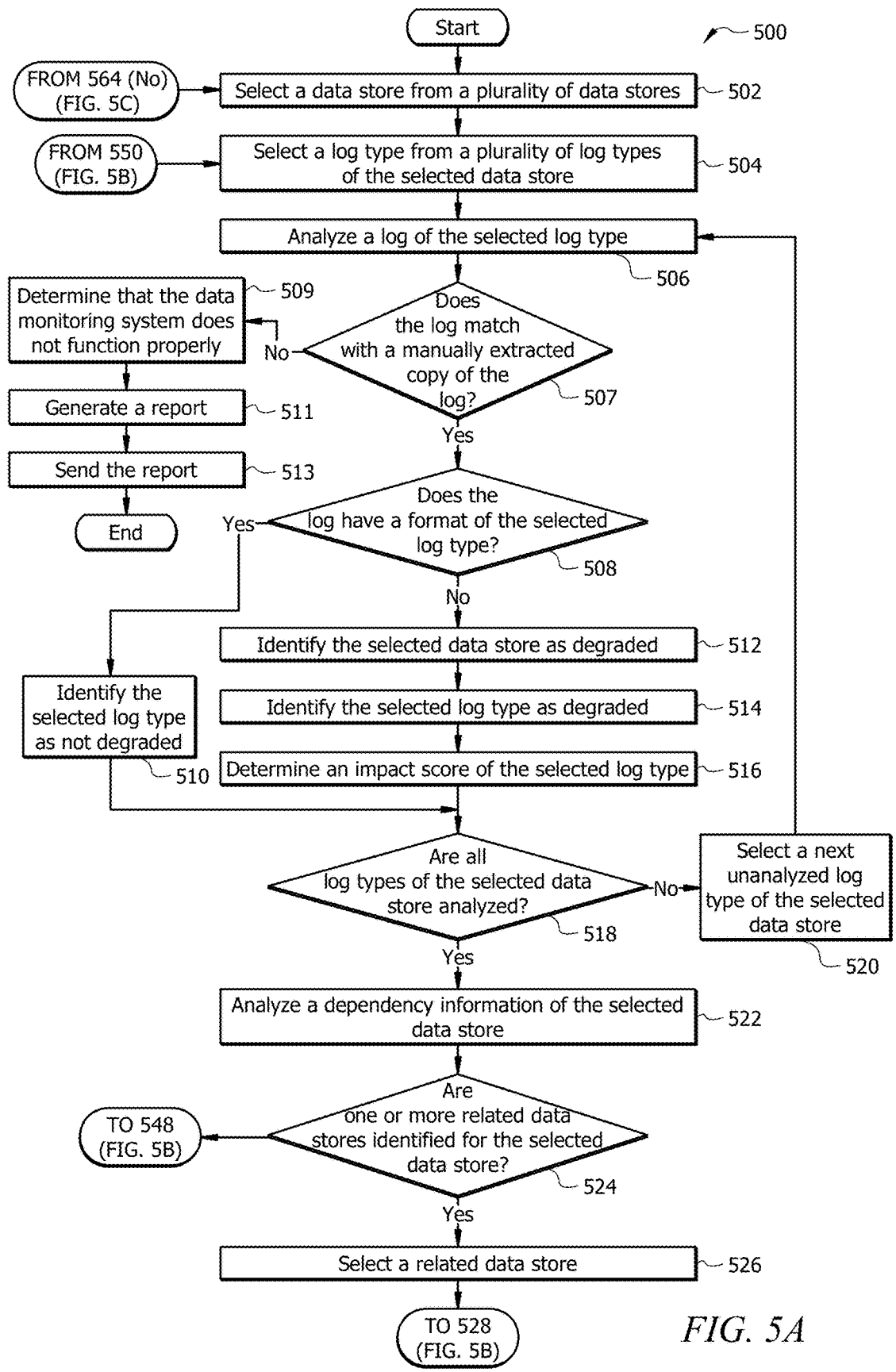
FIGS. 5A, 5B, and 5C illustrates an example method for automated data item degradation detection performed by the system of FIG. 1 for automated data source degradation detection.
Figure 5B:
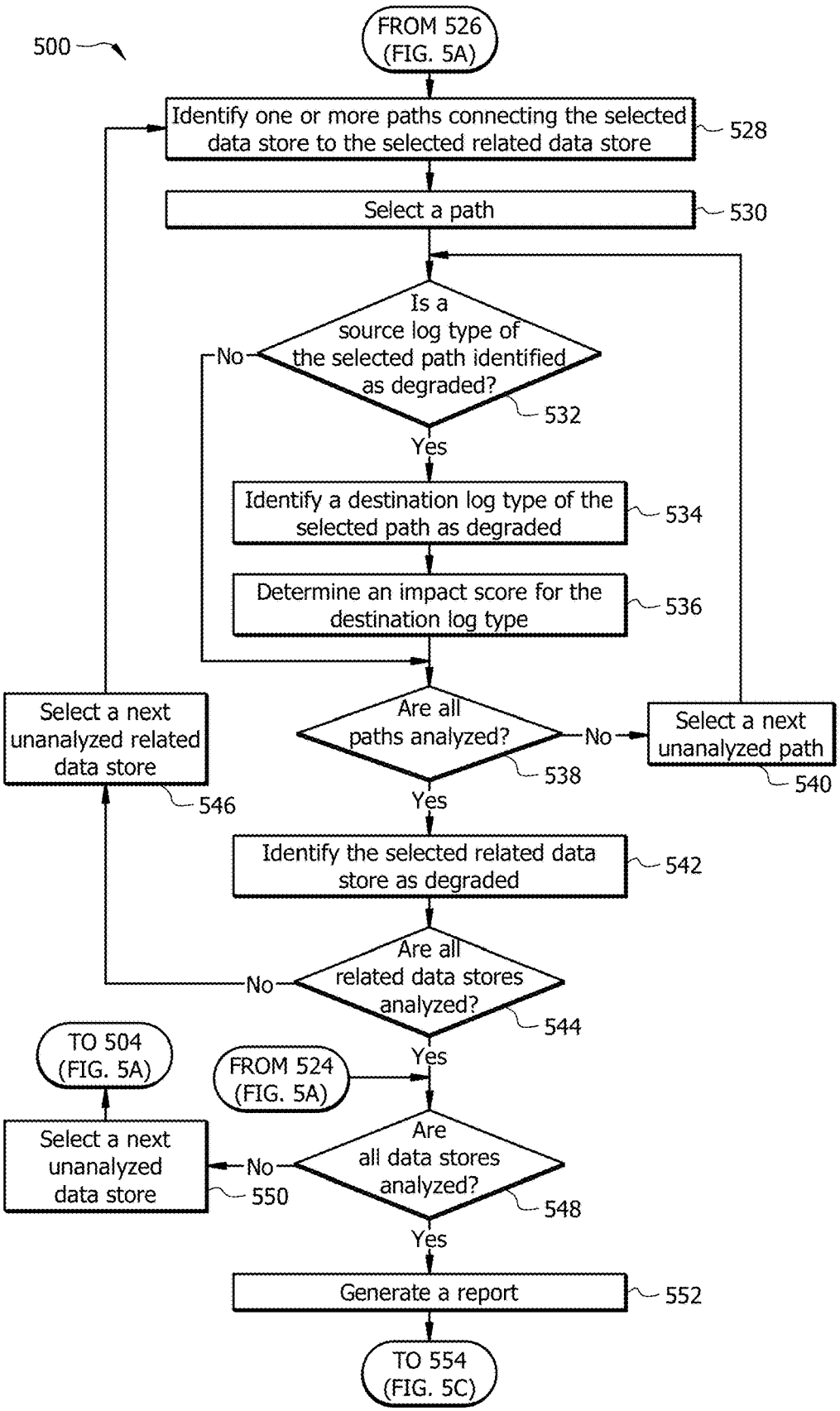
Figure 5C:
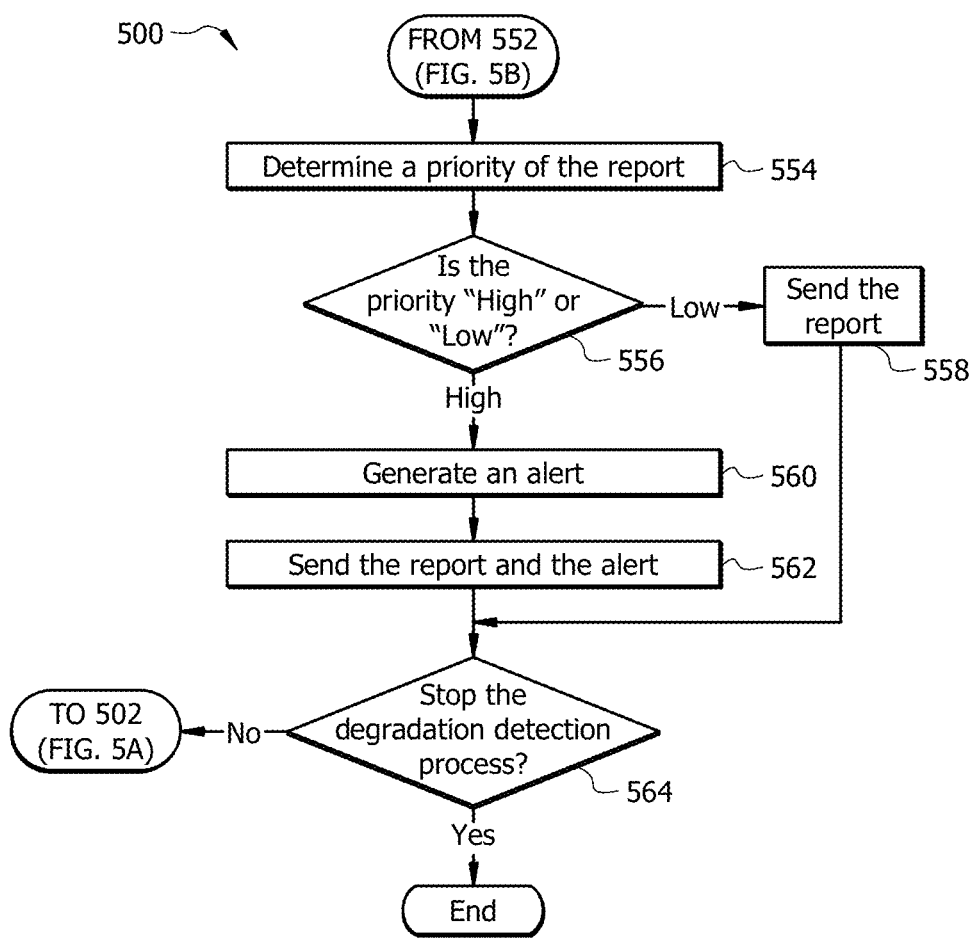

FIGS. 5A-5C illustrate an example flowchart of a method 500 for automated data item degradation detection. Modifications, additions, or omissions may be made to method 500. Method 500 may include more, fewer, or other operations. For example, operations may be performed in parallel or in any suitable order. For example, one or more operations of method 500 may be implemented, at least in part, in the form of software instructions (e.g., software instructions 112 and/or 188-1 through 188-$m$ of FIG. 1), stored on non-transitory, tangible, computer-readable medium (e.g., memories 110 and/or 186-1 through 186-$m$ of FIG. 1) that when executed by one or more processors (e.g., processors 106 and/or 182-1 through 182-$m$ of FIG. 1) may cause the one or more processors to perform operations 502-564. Method 500 is described below with reference to FIGS. 1 and 2.

Method 500 starts with operation 502, where a processor 106 of the data monitoring system 104 selects a data store (e.g., respective one of data stores 180-1 through 180-$m$) from a plurality of data stores 180. In certain embodiments when the plurality of data stores 180 comprise data stores 180-1 through 180-9 (see FIG. 2), the selected data store may be the data stores 180-1, 180-2, 180-4, or 180-7.

At operation 504, the processor 106 of the data monitoring system 104 selects a log type from a plurality of log types of the selected data store. In certain embodiments when the selected data store is the data store 180-1, the processor 106 of the data monitoring system 104 may select the log type 118-1. In certain embodiments when the selected data store is the data store 180-2, the processor 106 of the data monitoring system 104 may select the log type 204-2. In certain embodiments when the selected data store is the data store 180-4, the processor 106 of the data monitoring system 104 may select the log type 204-4. In certain embodiments when the selected data store is the data store 180-7, the processor 106 of the data monitoring system 104 may select the log type 204-7.

At operation 506, the processor 106 of the data monitoring system 104 analyzes a log of the selected log type. In certain embodiments when the selected log type is the log type 118-1, the processor 106 of the data monitoring system 104 analyzes a log 190-1. In certain embodiments when the selected log type is the log type 204-2, the processor 106 of the data monitoring system 104 analyzes a log 202-2. In certain embodiments when the selected log type is the log type 204-4, the processor 106 of the data monitoring system 104 analyzes a log 202-4. In certain embodiments when the selected log type is the log type 204-7, the processor 106 of the data monitoring system 104 analyzes a log 202-7.

At operation 507, the processor 106 of the data monitoring system 104 determines whether the log matches a manually extracted copy of the log. In response to determining at operation 507 that the log does not match the manually extracted copy of the log, method 500 proceeds to operation 509. At operation 509, the processor 106 of the data monitoring system 104 determines that the data monitoring system 104 does not function properly. At operation 511, the processor 106 of the data monitoring system 104 generates a report (e.g., report 174). In certain embodiments, the report (e.g., report 174) comprises an identification that the data monitoring system 104 does not function properly. At operation 513, the processor 106 of the data monitoring system 104 sends the report (e.g., report 174) to a data store maintenance team. After performing operation 513, method 500 ends.

In response to determining at operation 507 that the log matches the manually extracted copy of the log, method 500 proceeds to operation 508. At operation 508, the processor 106 of the data monitoring system 104 determines whether the log has a format of the selected log type. In certain embodiments when the selected log type is the log type 118-1, the processor 106 of the data monitoring system 104 determines whether the log 190-1 has the format 122-1 of the selected log type 118-1.

In response to determining at operation 508 that the log has the format of the selected log type, method 500 proceeds to operation 510. For example, the processor 106 of the data monitoring system 104 may determine that the log has anticipated fields, with each anticipated field having an anticipated format. At operation 510, the processor 106 of the data monitoring system 104 identifies the selected log type as not degraded. After performing operation 510, method 500 proceeds to operation 518. In response to determining at operation 508 that the log does not have the format of the selected log type, method 500 proceeds to operation 512. In certain embodiments, the processor 106 of the data monitoring system 104 may determine that the log has anticipated fields but may determine that at least one field has a format that is different from the anticipated format for the at least one field. In other embodiments, the processor 106 of the data monitoring system 104 may determine that the log is missing at least one of the anticipated fields. At operation 512, the processor 106 of the data monitoring system 104 identifies the selected data store (e.g., data store 180-1) as a degraded.

At operation 514, the processor 106 of the data monitoring system 104 identifies the selected log type (e.g., log type 118-1) as a degraded. At operation 516, the processor 106 of the data monitoring system 104 determines an impact score (e.g., impact score 120-1) of the selected log type (e.g., log type 118-1). In certain embodiments, the processor 106 of the data monitoring system 104 may determine the impact score (e.g., impact score 120-1) of the selected log type (e.g., log type 118-1) from the data store profile (e.g., data store profile 116-1) of the selected data store (e.g., data store 180-1).

After performing operations 510 or 516, method 500 proceeds to operation 518. At operation 518, the processor 106 of the data monitoring system 104 determines whether all log types (e.g., log types 118-1 through 118-*n*) of the selected data store (e.g., data store 180-1) are analyzed. In response to determining at operation 518 that all log types (e.g., log types 118-1 through 118-*n*) of the selected data store (e.g., data store 180-1) are not analyzed, method 500 proceeds to operation 520. At operation 520, the processor 106 of the data monitoring system 104 select a next unanalyzed log type (e.g., respective one of log types 118-1 through 118-*n*) of the selected data store (e.g., data store 180-1). After performing operation 520, method 500 proceeds to operation 506. In certain embodiments, operations 506 through 520 are performed one or more times until all log types (e.g., log types 118-1 through 118-*n*) of the selected data store (e.g., data store 180-1) are analyzed.

In response to determining at operation 518 that all log types (e.g., log types 118-1 through 118-*n*) of the selected data store (e.g., data store 180-1) are analyzed, method 500 proceeds to operation 522. At operation 522, the processor 106 of the data monitoring system 104 analyzes a dependency information (e.g., dependency information 124-1) of the selected data store (e.g., data store 180-1). In certain embodiments, the dependency information (e.g., dependency information 124-1) of the selected data store (e.g., data store 180-1) is stored in the data store profile (e.g., data store profile 116-1) of the selected data store (e.g., data store 180-1). At operation 524, the processor 106 of the data monitoring system 104 determines whether one or more related data stores are identified for the selected data store. In certain embodiments when the selected data store is the data store 180-1, the processor 106 of the data monitoring system 104 determines that no related data stores are identified for the selected data store. In certain embodiments when the selected data store is the data store 180-2, the processor 106 of the data monitoring system 104 identifies the data store 180-3 as a related data store for the selected data store. In certain embodiments when the selected data store is the data store 180-4, the processor 106 of the data monitoring system 104 identifies the data stores 180-5 and 180-6 as related data stores for the selected data store. In certain embodiments when the selected data store is the data store 180-7, the processor 106 of the data monitoring system 104 identifies the data stores 180-8 and 180-9 as related data stores for the selected data store.

In response to determining at operation 524 that no related data stores are identified for the selected data store (e.g., data store 180-1), method 500 proceeds to operation 548. In response to determining at operation 524 that the one or more related data stores (e.g., data stores 180-5 and 180-6 or data stores 180-8 and 180-9) are identified for the selected data store (e.g., data store 180-4 or data store 180-7), method 500 proceeds to operation 526. At operation 526, the processor 106 of the data monitoring system 104 selects a related data store from the one or more related data stores (e.g., data stores 180-5 and 180-6 or data stores 180-8 and 180-9).

At operation 528, the processor 106 of the data monitoring system 104 identifies one or more paths connecting the selected data store to the selected related data store. In certain embodiments when the selected data store is the data store 180-2 and the selected related data store is the data store 180-3, the processor 106 of the data monitoring system 104 identifies the pipeline 206-1 as a path connecting the selected data store to the selected related data store. In certain embodiments when the selected data store is the data store 180-4 and the selected related data store is the data store 180-5, the processor 106 of the data monitoring system 104 identifies the pipeline 206-2 as a path connecting the selected data store to the selected related data store. In certain embodiments when the selected data store is the data store 180-4 and the selected related data store is the data store 180-6, the processor 106 of the data monitoring system 104 identifies the pipeline 206-3 as a path connecting the selected data store to the selected related data store. In certain embodiments when the selected data store is the data store 180-7 and the selected related data store is the data store 180-8, the processor 106 of the data monitoring system 104 identifies the pipeline 206-4 as a path connecting the selected data store to the selected related data store. In certain embodiments when the selected data store is the data store 180-7 and the selected related data store is the data store 180-9, the processor 106 of the data monitoring system 104 identifies the pipelines 206-4 and 206-5 as a path connecting the selected data store to the selected related data store.

At operation 530, the processor 106 of the data monitoring system 104 selects a path of the one or more paths. At operation 532, the processor 106 of the data monitoring system 104 determines whether a source log type of the selected path is identified as degraded. In certain embodiments when the selected path comprises the pipeline 206-1, the processor 106 of the data monitoring system 104 determines whether a source log type 204-2 is identified as degraded. In certain embodiments when the selected path comprises the pipelines 206-2 or 206-3, the processor 106 of the data monitoring system 104 determines whether a source log type 204-4 is identified as degraded. In certain embodiments when the selected path comprises the data pipeline 206-4 or data pipelines 206-4 and 206-5, the processor 106 of the data monitoring system 104 determines whether a source log type 204-7 is identified as degraded.

In response to determining at operation 532 that the source log type of the selected path is identified as degraded, method 500 proceeds to operation 534. At operation 534, the processor 106 of the data monitoring system 104 identifies a destination log type of the selected path as degraded. In certain embodiments when the selected path comprises the pipeline 206-1, the processor 106 of the data monitoring system 104 identifies a destination log type 204-3 as degraded. In certain embodiments when the selected path comprises the pipelines 206-2, the processor 106 of the data monitoring system 104 identifies a destination log type 204-5 as degraded. In certain embodiments when the selected path comprises the pipelines 206-3, the processor 106 of the data monitoring system 104 identifies a destination log type 204-6 as degraded. In certain embodiments when the selected path comprises the pipeline 206-4, the processor 106 of the data monitoring system 104 identifies a destination log type 204-8 as degraded. In certain embodiments when the selected path comprises the pipelines 206-4 and 206-5, the processor 106 of the data monitoring system 104 identifies a destination log type 134-1 as degraded. At operation 534, the processor 106 of the data monitoring system 104 determines an impact score for the degraded destination log type. For example, when the degraded destination log type comprises the log type 134-1, the processor 106 of the data monitoring system 104 determines the impact score 136-1 as an impact score for the degraded destination log type.

In response to determining at operation 532 that the source log type of the selected path is identified as not degraded or after performing operation 536, method 500 proceeds to operation 538. At operation 538, the processor 106 of the data monitoring system 104 determines whether are all paths are analyzed. In response to determining at operation 538 that all paths are not analyzed, method 500 proceeds to operation 540. At operation 540, the processor 106 of the data monitoring system 104 selects a next unanalyzed path of the one or more paths. After operation 540, method 500 proceeds to operation 532. In certain embodiments, operations 532 through 540 may be repeated one or more times until all paths are analyzed.

In response to determining at operation 538 that all paths are analyzed, method 500 proceeds to operation 542. At operation 542, the processor 106 of the data monitoring system 104 identifies the selected related data store as degraded. In certain embodiments when the selected data store comprises the data store 180-2, the processor 106 of the data monitoring system 104 identifies the selected related data store 180-3 as degraded. In certain embodiments when the selected data store comprises the data store 180-4, the processor 106 of the data monitoring system 104 identifies the selected related data stores 180-5 or 180-6 as degraded. In certain embodiments when the selected data store comprises the data store 180-7, the processor 106 of the data monitoring system 104 identifies the selected related data stores 180-8 or 180-9 as degraded.

At operation 544, the processor 106 of the data monitoring system 104 determines whether all related data stores are analyzed. In response to determining at operation 544 that all related data stores are not analyzed, 500 proceeds to operation 546. At operation 546, the processor 106 of the data monitoring system 104 select a next unanalyzed related data store from the one or more related data stores. After performing operation 546, method 500 proceeds to operation 528. In certain embodiments, operation 528 through 546 may be performed one or more times until all related data stores are analyzed. In response to determining at operation 544 that all related data stores are analyzed, 500 proceeds to operation 548. At operation 548, the processor 106 of the data monitoring system 104 determines whether all data stores (e.g., data stores 180) are analyzed.

In response to determining at operation 548 that all data stores are not analyzed, method 500 proceeds to operation 550. At operation 550, the processor 106 of the data monitoring system 104 selects a next unanalyzed data store. In certain embodiments when the selected data store comprises the data store 180-1, the processor 106 of the data monitoring system 104 may select the data stores 180-2, 180-4, or 180-7 as the next unanalyzed data store. In certain embodiments when the selected data store comprises the data store 180-2, the processor 106 of the data monitoring system 104 may select the data stores 180-1, 180-4, or 180-7 as the next unanalyzed data store. In certain embodiments when the selected data store comprises the data store 180-4, the processor 106 of the data monitoring system 104 may select the data stores 180-1, 180-2, or 180-7 as the next unanalyzed data store. In certain embodiments when the selected data store comprises the data store 180-7, the processor 106 of the data monitoring system 104 may select the data stores 180-1, 180-2, or 180-4 as the next unanalyzed data store. After performing operation 550, method 500 proceeds to operation 504. In certain embodiments, operations 504 through 550 may be repeated one or more times until all data stores are analyzed.

In response to determining at operation 548 that all data stores are analyzed, method 500 proceeds to operation 552. At operation 552, the processor 106 of the data monitoring system 104 generates a report (e.g., report 174). In certain embodiments, the report (e.g., report 174) comprises identifications of degraded data stores, identifications of degraded log types for each degraded data store, and impact scores of the degraded log types. In certain embodiments, the report (e.g., report 174) is updated as the data stores are analyzed.

At operation 554, the processor 106 of the data monitoring system 104 determines a priority (e.g., priority 176) of the report (e.g., report 174). In certain embodiments, the processor 106 of the data monitoring system 104 determines the priority (e.g., priority 176) of the report (e.g., report 174) based at least in part on the impact scores of the degraded log types. At operation 556, the processor 106 of the data monitoring system 104 determines whether the priority (e.g., priority 176) is "High" or "Low."

In response to determining at operation 556 that the priority (e.g., priority 176) is "Low," method 500 proceeds to operation 558. At operation 558, the processor 106 of the data monitoring system 104 sends the report (e.g., report 174) to a data store maintenance team. After performing operation 558, method 500 proceeds to operation 564. In response to determining at operation 556 that the priority (e.g., priority 176) is "High," method 500 proceeds to operation 560. At operation 560, the processor 106 of the data monitoring system 104 generates an alert (e.g., alert 178) that the report (e.g., report 174) needs an immediate response. At operation 562, the processor 106 of the data monitoring system 104 sends the report (e.g., report 174) and the alert (e.g., alert 178) to the data store maintenance team.

After performing operations 558 or 562, method 500 proceeds to operation 564. At operation 564, the processor 106 of the data monitoring system 104 determines whether to stop the degradation detection process. In certain embodiments, the processor 106 of the data monitoring system 104 may determine to stop the degradation detection process in response to receiving an instruction (e.g., instruction 196) to stop the degradation detection process. In response to determining at operation 564 that the instruction (e.g., instruction 196) to stop the degradation detection process is not received, method 500 proceeds to operation 502. In certain embodiments, operations 502 through 564 may be repeated one or more times until the instruction (e.g., instruction 196) to stop the degradation detection process is received. In response to determining at operation 564 that the instruction (e.g., instruction 196) to stop the degradation detection process is received, method 500 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a memory configured to store:
  a first database comprising a first profile for a first data store of a plurality of data stores, wherein the first profile comprises:
    a first plurality of log types that are generated by the first data store;
    a first plurality of impact scores associated with the first plurality of log types; and
    first dependency information for the first data store, wherein the first dependency information identifies that no data store receives data items from the first data store; and
  a second database comprising:
    a first plurality of numbers; and
    a first plurality of timestamps associated with the first plurality of numbers, wherein each of the first plurality of numbers is a number of logs of a first log type that were generated by the first data store at a time defined by a respective timestamp for a first time interval; and
a processor operably coupled to the memory and configured to:
  determine a first number of logs of the first log type that are generated by the first data store at a first time for the first time interval;
  determine a first baseline number and a first threshold value based on the first plurality of numbers, wherein the first baseline number is an expected number of logs of the first log type generated by the first data store at the first time for the first time interval;
  compare the first number of logs of the first log type to the first baseline number; and
  in response to determining that the first number of logs of the first log type differs from the first baseline number by more than the first threshold value:
    identify the first data store as degraded;
    identify the first log type as degraded;
    determine a first impact score of the first log type;
    analyze the first dependency information for the first data store; and
    in response to determining that no data store receives data items from the first data store, generate a report, wherein the report comprises:
      an identification that the first data store is degraded;
      an identification that the first log type is degraded; and
      the first impact score of the first log type.

2. The system of claim 1, wherein the processor is further configured to, in response to determining that the first number of logs of the first log type differs from the first baseline number by less than the first threshold value, save the first number of logs of the first log type in the second database.

3. The system of claim 1, wherein the processor is further configured to, in response to determining that the first number of logs of the first log type differs from the first baseline number by less than the first threshold value, identify the first log type as not degraded.

4. The system of claim 1, wherein:
the first database further comprises:
  a second profile for a second data store of the plurality of data stores, wherein the second profile comprises:

a second plurality of log types that are generated by the second data store;
a second plurality of impact scores associated with the second plurality of log types; and
second dependency information for the second data store, wherein the second dependency information identifies a first data pipeline that associates logs of a second log type generated by the second data store with logs of a third log type generated by a third data store; and
a third profile for a third data store of the plurality of data stores, wherein the third profile comprises:
a third plurality of log types that are generated by the third data store;
a third plurality of impact scores associated with the third plurality of log types; and
third dependency information for the third data store, wherein the third dependency information identifies that no data store receives data items from the third data store; and
the second database further comprises:
a second plurality of numbers; and
a second plurality of timestamps associated with the second plurality of numbers, wherein each of the second plurality of numbers is a number of logs of the second log type that were generated by the second data store at a time defined by a respective timestamp for the first time interval; and
the processor is further configured to:
determine a second number of logs of the second log type that are generated by the second data store at a second time for the first time interval;
determine a second baseline number and a second threshold value based on the second plurality of numbers, wherein the second baseline number is an expected number of logs of the second log type generated by the second data store at the second time for the first time interval;
compare the second number of logs of the second log type to the second baseline number; and
in response to determining that the second number of logs of the second log type differs from the second baseline number by more than the second threshold value:
identify the second data store as degraded;
identify the second log type as degraded;
determine a second impact score of the second log type;
analyze the second dependency information for the second data store; and
in response to determining that the first data pipeline associates the logs of the second log type generated by the second data store with the logs of the third log type generated by the third data store:
identify the third data store as degraded;
identify the third log type as degraded;
determine a third impact score of the third log type;
analyze the third dependency information for the third data store; and
in response to determining that no data store receives data items from the third data store, update the report, wherein the report further comprises:
an identification that the second data store is degraded;
an identification that the second log type is degraded;
the second impact score of the second log type;
an identification that the third data store is degraded;
an identification that the third log type is degraded; and
the third impact score of the third log type.

5. The system of claim 4, wherein the processor is further configured to:
determine a priority of the report based at least in part on the first impact score, the second impact score and the third impact score; and
in response to determining that the priority is "high":
generate an alert that an immediate response to the report is needed;
send the report to a data store maintenance team; and
send the alert to the data store maintenance team.

6. The system of claim 4, wherein the processor is further configured to:
determine a priority of the report based at least in part on the first impact score, the second impact score and the third impact score; and
in response to determining that the priority is "low," send the report to a data store maintenance team.

7. The system of claim 1, wherein the processor is further configured to:
determine if a notice of maintenance is received for the first data store; and
in response to determining that the notice of maintenance is received for the first data store, update the report, wherein the report further comprises an identification that the first data store is degraded due to maintenance.

8. A method comprising:
determining a first number of logs of a first log type that are generated by a first data store at a first time for a first time interval;
determining a first baseline number and a first threshold value based on a first plurality of numbers, wherein each of the first plurality of numbers is a number of logs of the first log type that were generated by the first data store at a time defined by a respective timestamp for the first time interval, and wherein the first baseline number is an expected number of logs of the first log type generated by the first data store at the first time for the first time interval;
comparing the first number of logs of the first log type to the first baseline number; and
in response to determining that the first number of logs of the first log type differs from the first baseline number by more than a first threshold value:
identifying the first data store as degraded;
identifying the first log type as degraded;
determining a first impact score of the first log type;
analyzing first dependency information for the first data store; and
in response to determining that no data store receives data items from the first data store, generating a report, wherein the report comprises:
an identification that the first data store is degraded;
an identification that the first log type is degraded; and
the first impact score of the first log type.

9. The method of claim 8, further comprising, in response to determining that the first number of logs of the first log type differs from the first baseline number by less than the first threshold value, saving the first number of logs of the first log type.

10. The method of claim 8, further comprising, in response to determining that the first number of logs of the first log type differs from the first baseline number by less than the first threshold value, identifying the first log type as not degraded.

11. The method of claim 8, further comprising:
determining a second number of logs of a second log type that are generated by a second data store at a second time for the first time interval;
determining a second baseline number and a second threshold value based on a second plurality of numbers, wherein each of the second plurality of numbers is a number of logs of the second log type that were generated by the second data store at a time defined by a respective timestamp for the first time interval, and wherein the second baseline number is an expected number of logs of the second log type generated by the second data store at the second time for the first time interval;
comparing the second number of logs of the second log type to the second baseline number; and
in response to determining that the second number of logs of the second log type differs from the second baseline number by more than a second threshold value:
identifying the second data store as degraded;
identifying the second log type as degraded;
determining a second impact score of the second log type;
analyzing second dependency information for the second data store; and
in response to determining that a first data pipeline associates logs of the second log type generated by the second data store with logs of a third log type generated by a third data store:
identifying the third data store as degraded;
identifying the third log type as degraded;
determining a third impact score of the third log type;
analyzing third dependency information for the third data store; and
in response to determining that no data store receives data items from the third data store, updating the report, wherein the report further comprises:
an identification that the second data store is degraded;
an identification that the second log type is degraded;
the second impact score of the second log type;
an identification that the third data store is degraded;
an identification that the third log type is degraded; and
the third impact score of the third log type.

12. The method of claim 11, further comprising:
determining a priority of the report based at least in part on the first impact score, the second impact score and the third impact score; and
in response to determining that the priority is "high":
generating an alert that an immediate response to the report is needed;
sending the report to a data store maintenance team; and
sending the alert to the data store maintenance team.

13. The method of claim 11, further comprising:
determining a priority of the report based at least in part on the first impact score, the second impact score and the third impact score; and
in response to determining that the priority is "low," sending the report to a data store maintenance team.

14. The method of claim 8, further comprising:
determining if a notice of maintenance is received for the first data store; and
in response to determining that the notice of maintenance is received for the first data store, updating the report, wherein the report further comprises an identification that the first data store is degraded due to maintenance.

15. A non-transitory computer-readable medium storing instructions that, when executed by one or more processors, cause the one or more processors to:
determine a first number of logs of a first log type that are generated by a first data store at a first time for a first time interval;
determine a first baseline number and a first threshold value based on a first plurality of numbers, wherein each of the first plurality of numbers is a number of logs of the first log type that were generated by the first data store at a time defined by a respective timestamp for the first time interval, and wherein the first baseline number is an expected number of logs of the first log type generated by the first data store at the first time for the first time interval;
compare the first number of logs of the first log type to the first baseline number; and
in response to determining that the first number of logs of the first log type differs from the first baseline number by more than a first threshold value:
identify the first data store as degraded;
identify the first log type as degraded;
determine a first impact score of the first log type;
analyze first dependency information for the first data store; and
in response to determining that no data store receives data items from the first data store, generate a report, wherein the report comprises:
an identification that the first data store is degraded;
an identification that the first log type is degraded; and
the first impact score of the first log type.

16. The non-transitory computer-readable medium of claim 15, wherein the instructions, when executed by the one or more processors, further cause the one or more processors to, in response to determining that the first number of logs of the first log type differs from the first baseline number by less than the first threshold value, save the first number of logs of the first log type.

17. The non-transitory computer-readable medium of claim 15, wherein the instructions, when executed by the one or more processors, further cause the one or more processors to, in response to determining that the first number of logs of the first log type differs from the first baseline number by less than the first threshold value, identify the first log type as not degraded.

18. The non-transitory computer-readable medium of claim 15, wherein the instructions, when executed by the one or more processors, further cause the one or more processors to:
determine a second number of logs of a second log type that are generated by a second data store at a second time for the first time interval;
determine a second baseline number and a second threshold value based on a second plurality of numbers, wherein each of the second plurality of numbers is a number of logs of the second log type that were generated by the second data store at a time defined by a respective timestamp for the first time interval, and wherein the second baseline number is an expected number of logs of the second log type generated by the second data store at the second time for the first time interval;

compare the second number of logs of the second log type to the second baseline number; and in response to determining that the second number of logs of the second log type differs from the second baseline number by more than a second threshold value:
identify the second data store as degraded;
identify the second log type as degraded;
determine a second impact score of the second log type;
analyze second dependency information for the second data store; and
in response to determining that a first data pipeline associates logs of the second log type generated by the second data store with logs of a third log type generated by a third data store:
identify the third data store as degraded;
identify the third log type as degraded;
determine a third impact score of the third log type;
analyze third dependency information for the third data store; and
in response to determining that no data store receives data items from the third data store, update the report, wherein the report further comprises:
an identification that the second data store is degraded;
an identification that the second log type is degraded;
the second impact score of the second log type;
an identification that the third data store is degraded;
an identification that the third log type is degraded; and
the third impact score of the third log type.

19. The non-transitory computer-readable medium of claim 18, wherein the instructions, when executed by the one or more processors, further cause the one or more processors to:
determine a priority of the report based at least in part on the first impact score, the second impact score and the third impact score; and
in response to determining that the priority is "high":
generate an alert that an immediate response to the report is needed;
send the report to a data store maintenance team; and
send the alert to the data store maintenance team.

20. The non-transitory computer-readable medium of claim 18, wherein the instructions, when executed by the one or more processors, further cause the one or more processors to:
determine a priority of the report based at least in part on the first impact score, the second impact score and the third impact score; and
in response to determining that the priority is "low," send the report to a data store maintenance team.

\* \* \* \* \*